United States Patent
Arai et al.

(10) Patent No.: US 11,319,420 B2
(45) Date of Patent: *May 3, 2022

(54) PREPREG AND CARBON FIBER REINFORCED COMPOSITE MATERIAL

(71) Applicant: TORAY INDUSTRIES, INC., Tokyo (JP)

(72) Inventors: Atsuhito Arai, Ehime (JP); Koji Furukawa, Ehime (JP); Atsuki Sugimoto, Ehime (JP); Masahiro Mino, Ehime (JP); Mayumi Mihara, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 16/496,219

(22) PCT Filed: Mar. 16, 2018

(86) PCT No.: PCT/JP2018/010478
§ 371 (c)(1),
(2) Date: Sep. 20, 2019

(87) PCT Pub. No.: WO2018/173953
PCT Pub. Date: Sep. 27, 2018

(65) Prior Publication Data
US 2020/0056005 A1 Feb. 20, 2020

(30) Foreign Application Priority Data

Mar. 24, 2017 (JP) .............................. JP2017-058758
Jul. 28, 2017 (JP) .............................. JP2017-146292

(51) Int. Cl.
| C08J 5/24 | (2006.01) |
| C08G 59/24 | (2006.01) |
| C08G 59/28 | (2006.01) |
| C08G 59/38 | (2006.01) |
| C08G 59/50 | (2006.01) |
| B32B 27/38 | (2006.01) |
| C08K 7/06 | (2006.01) |
| C08K 3/04 | (2006.01) |

(52) U.S. Cl.
CPC ............... *C08J 5/24* (2013.01); *C08G 59/24* (2013.01); *C08G 59/28* (2013.01); *C08G 59/38* (2013.01); *C08G 59/5033* (2013.01); *C08K 3/04* (2013.01); *C08K 7/06* (2013.01); *C08J 2363/00* (2013.01)

(58) Field of Classification Search
None
See application file for complete search history.

(56) References Cited

U.S. PATENT DOCUMENTS

| 4,539,253 A | 9/1985 | Hirschbuehler et al. |
| 4,604,319 A | 8/1986 | Evans et al. |
| 5,248,360 A * | 9/1993 | Jones, Jr. .............. C07D 303/24 156/166 |
| 6,399,199 B1 * | 6/2002 | Fujino ........................ C08J 5/24 428/293.4 |
| 2007/0184280 A1 | 8/2007 | Tanaka et al. |
| 2010/0016473 A1 * | 1/2010 | Kaji ..................... C08G 59/245 523/400 |
| 2012/0149807 A1 | 6/2012 | Asaumi et al. |
| 2013/0202873 A1 | 8/2013 | Mizuki et al. |
| 2016/0340485 A1 | 11/2016 | Nomura et al. |
| 2017/0349695 A1 | 12/2017 | Katagi et al. |
| 2021/0115208 A1 * | 4/2021 | Sugimoto ................ C08J 5/042 |

FOREIGN PATENT DOCUMENTS

| CN | 104024332 A | 9/2014 | |
| EP | 2 975 088 A1 | 1/2016 | |
| JP | 58206579 A * | 12/1983 | .......... C07D 303/16 |
| JP | 60-231738 A | 11/1985 | |
| JP | 6-94515 B2 | 11/1994 | |
| JP | 7-278412 A | 10/1995 | |
| JP | 2001-139662 A | 5/2001 | |
| JP | 2005-206814 A | 8/2005 | |
| JP | 2011-84557 A | 4/2011 | |
| JP | 2011-219737 A | 11/2011 | |
| WO | WO 2011/027802 A1 | 3/2011 | |
| WO | WO 2013/065758 A1 | 5/2013 | |
| WO | WO 2016/098709 A1 | 6/2016 | |
| WO | WO 2016/104788 A1 | 6/2016 | |

OTHER PUBLICATIONS

Machine translation of JP-58206579-A (no date).*
Extended European Search Report dated Nov. 20, 2020, in European Patent Application No. 18771994.3.
International Search Report, issued in PCT/JP2018/010478, PCT/ISA/210, dated Jun. 19, 2018.
Written Opinion of the International Searching Authority, issued in PCT/JP2018/010478, PCT/ISA/237, dated Jun. 19, 2018.
Office Action dated Jul. 13, 2021, in Chinese Patent Application No. 201880019658.3.

* cited by examiner

*Primary Examiner* — Michael J Feely
(74) *Attorney, Agent, or Firm* — Birch, Stewart, Kolasch & Birch, LLP

(57) ABSTRACT

A prepreg containing the following constituent elements [A] to [C], wherein a resin composition containing the constituent elements [B] and [C] has a higher-order structure derived from a diffraction angle 2θ between 1.0° and 6.0° observed with X-ray diffraction after curing:
[A]: carbon fibers
[B]: epoxy resin
[C]: curing agent of [B].

23 Claims, 1 Drawing Sheet

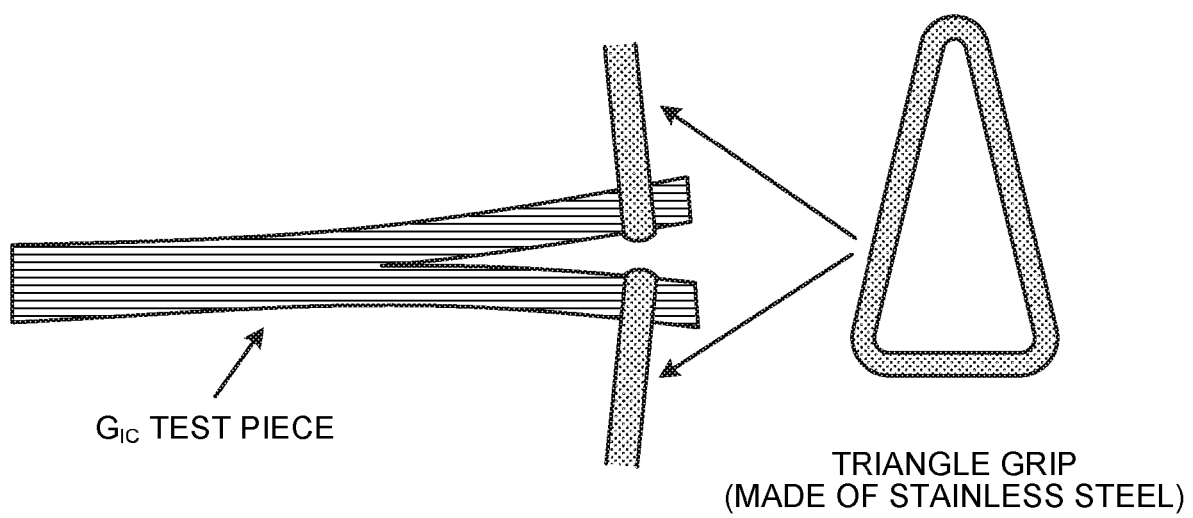

PREPREG AND CARBON FIBER REINFORCED COMPOSITE MATERIAL

FIELD

The present invention relates to a prepreg from which a carbon fiber reinforced composite material having both excellent interlaminar toughness and tensile strength is obtained, and a carbon fiber reinforced composite material.

BACKGROUND

Conventional fiber reinforced composite materials comprising reinforcing fibers such as carbon fibers or glass fibers, and a thermosetting resin such as an epoxy resin or a phenol resin are lightweight while having excellent mechanical properties such as strength and stiffness, heat resistance and corrosion resistance, and Therefore, have been applied to many fields, such as space and aeronautics, automobiles, rolling stock, ships, civil engineering and construction, and sporting goods. In particular, fiber reinforced composite materials using continuous reinforcing fibers are used in applications demanding high performance, carbon fibers with an excellent specific strength and specific elastic modulus are often used as the reinforcing fibers and a thermosetting resin, particularly an epoxy resin with excellent adhesion to carbon fibers, is often used as the matrix resin.

The carbon fiber reinforced composite material is a heterogeneous material, the essential constituent elements of which are reinforcing fibers and a matrix resin, and Therefore, there is a large difference between the physical properties in the direction the reinforcing fibers are arranged and the physical properties in the other directions. It is known, for example, that improving the reinforcing fiber strength alone does not lead to a dramatic improvement in the interlaminar toughness, which indicates how difficult it is for a fracture to progress between reinforcing fiber layers. In particular, a carbon fiber reinforced composite material having a thermosetting resin as the matrix resin reflects the low toughness of the matrix resin and has the property of easily fracturing in response to stress in a direction other than the direction of the reinforcing fiber arrangement. Therefore, technologies have been proposed for applications such as aircraft structural materials that require high strength and reliability with the object of maintaining fiber-direction strength while improving the interlaminar strength and other composite material properties to handle stress from directions other than the direction of the reinforcing fiber arrangement.

In recent years, there has been an expansion in the portions of aircraft structural materials to which carbon fiber reinforced composite materials can be applied, progress has been made in the application of carbon fiber reinforced composite materials to windmill blades and turbines with the aim of improving power generation efficiency and energy conversion energy, and research into the application to thick members and members having three-dimensional curves surfaces has advanced. When a tensile or compression stress bears on such a thick member or curved member, a peeling stress is produced in the out-of-plane direction between prepreg fiber layers, a crack may be produced due to an opening mode between the layers, and the strength and stiffness of the member overall may decrease due to crack development, leading to a complete fracture. In order to counter this stress, interlaminar toughness is needed in the open mode, i.e., mode I. In order to obtain a carbon fiber reinforced composite material having a high mode I interlaminar toughness, high adhesion between the reinforcing fibers and the matrix resin and high toughness in the matrix resin are needed.

In order to improve the toughness of the matrix resin, a method (refer to Patent Literature 1) exists for mixing a rubber component into a matrix resin and another method (refer to Patent Literature 2) exists for mixing a thermosetting resin, but the effects obtained are not adequate. A method for inserting a type of adhesion layer called an interleaf or an impact-absorbing layer between layers (refer to Patent Literature 3) and a method for (refer to Patent Literature 4) using particles for interlaminar strengthening have been proposed, but despite being effective for mode II interlaminar toughness, these methods do not obtain adequate effects for mode I interlaminar toughness.

CITATION LIST

Patent Literature

Patent Literature 1: Japanese Patent Application Laid-open No. 2001-139662

Patent Literature 2: Japanese Patent Application Laid-open No. H7-278412

Patent Literature 3: Japanese Patent Application Laid-open No. S60-231738

Patent Literature 4: Japanese Patent Application Laid-open No. H6-94515

SUMMARY

Technical Problem

It is an object of the present invention to provide a prepreg from which a carbon fiber reinforced composite material with superior mode I interlaminar toughness, mode II interlaminar toughness and tensile strength is obtained, and a carbon fiber reinforced composite material.

Solution to Problem

To solve the problem described above, the present invention adopts the following means. A prepreg according to the present invention is a prepreg including the following constituent elements [A] to [C]. A resin composition containing the constituent elements [B] and [C] has a higher-order structure derived from a diffraction angle 2θ between 1.0° and 6.0° observed with X-ray diffraction after curing:

[A]: carbon fibers
[B]: epoxy resin
[C]: curing agent of [B].

A prepreg according to the present invention is a prepreg including the following constituent elements [A] to [C]. A resin cured product obtained by curing a resin composition containing the constituent elements [B] and [C] has an endothermic peak at 250° C. or higher when heated from 50° C. to 400° C. at a rate of 5° C./min in differential scan calorimetric analysis under a nitrogen atmosphere:

[A]: carbon fibers
[B]: epoxy resin
[C]: curing agent of [B].

A prepreg according to the present invention is a carbon fiber reinforced composite material including the following constituent element [A] and a resin cured product formed by curing a resin composition containing the following constituent elements [B] and [C], the resin cured product having a higher-order structure derived from a diffraction angle 2θ between 1.0° and 6.0° observed with X-ray diffraction:
[A]: carbon fibers
[B]: epoxy resin
[C]: curing agent of [B].

A carbon fiber reinforced composite material according to the present invention is a carbon fiber reinforced composite material including the above-mentioned constituent element [A] and a resin cured product formed by curing a resin composition having the above-mentioned constituent elements [B] and [C], the resin cured product having an endothermic peak at a temperature of 250° C. or higher in differential scanning calorimetry analysis.

Advantageous Effects of Invention

In the present invention, a carbon fiber reinforced composite material is obtained with superior mode I interlaminar toughness, mode II interlaminar toughness, and tensile strength.

BRIEF DESCRIPTION OF DRAWINGS

FIG. 1 is a view illustrating the measurements of mode I interlaminar toughness ($G_{IC}$).

DESCRIPTION OF EMBODIMENTS

A fiber structure such as, for example, long fibers arranged in one direction, a single tow, a woven cloth, a knit, a non-woven cloth, a mat or a plaited cord may be used as the carbon fibers, which are the constituent element [A] of the present invention, without limitation to the fiber mode or arrangement. The carbon fibers of the constituent element [A] are optionally two or more kinds of carbon fibers, and are optionally used in combination with another reinforcing fiber such as glass fibers, aramid fibers, boron fibers, PBO fibers, high-strength polyethylene fibers, aluminum oxide fibers, or silicon carbide fibers.

Specific examples of the carbon fibers include acrylic, pitch and rayon carbon fibers, and, in particular, an acrylic carbon fiber with a high tensile strength is favorably used.

The acrylic carbon fibers may be produced through, for example, the following process. A spinning dope containing polyacrylonitrile obtained from a monomer having acrylonitrile as the main component is extruded with a wet spinning method, a dry-jet wet spinning method, a dry spinning method or a melt spinning method. The coagulated thread after spinning undergoes a spinning step to become a precursor that then undergoes steps such as stabilization and carbonization to obtain carbon fibers.

Although twisted yarn, untwisted yarn, non-twisted yarn and the like can be used as the form of the carbon fiber, because the orientation of the filaments composing the carbon fibers is not parallel in the case of twisted fibers, the use of twisted fibers can cause a reduction in mechanical properties of the resulting carbon fiber reinforced composite material, and Therefore, untwisted fibers or non-twisted fibers with a balance between the moldability and the strength property of the carbon fiber reinforced composite material are preferably used.

The carbon fibers used in the present invention preferably have a tensile modulus in the range of 200 to 440 GPa. The tensile modulus of the carbon fibers is affected by the crystallinity of the graphite structure composing the carbon fibers, the elastic modulus improving as the crystallinity increases. This range is preferable because of the high level and balance of both the stiffness and the strength of the carbon fiber reinforced composite material. The elastic modulus is more favorably within the range of 230 to 400 GPa and yet more favorably within the range of 260 to 370 GPa.

The tensile elongation of the carbon fibers is preferably within the range of 0.8 to 3.0%. If the tensile elongation of the carbon fibers is less than 0.8%, the tensile strength and the impact resistance may not be adequately expressed in a fiber reinforced composite material. If the tensile elongation exceeds 3%, there is a tendency for the elastic modulus of the carbon fibers to decrease. The tensile elongation of the carbon fibers is more preferably 1.0 to 2.5% and yet more preferably within the range of 1.2 to 2.3%. Herein, the elastic modulus and the tensile elongation of the carbon fibers were measured according to JIS R7601-2006.

Examples of the carbon fibers that are commercially available include "TORAYCA (registered trademark)" T800S-24K, "TORAYCA (registered trademark)" T300-3K, "TORAYCA (registered trademark)" T700S-12K and "TORAYCA (registered trademark)" T1100G-24K (all manufactured by Toray Industries, Inc.)

The single fiber fineness of the carbon fibers used in the present invention is preferably 0.2 to 2.0 dtex and more preferably 0.4 to 1.8 dtex. If the single fiber fineness is less than 0.2 dtex, damage to the carbon fibers may easily occur due to contact with the guide roller during twisting, and similar damage may occur at the resin composition impregnation treatment step. If the single fiber fineness exceeds 2.0 dtex, the resin composition may not adequately impregnate the carbon fibers, resulting in a reduction in the fatigue resistance.

For the carbon fibers used in the present invention, the number of filaments per fiber bundle is preferably within the range of 2500 to 50000. If the number of filaments is less than 2500, the fiber arrangement may easily meander and easily cause a reduction in strength. If the number of filaments exceeds 50000, resin impregnation during prepreg production or molding may be difficult. The number of filaments is more preferably within the range of 2800 to 40000.

Because carbon fibers are bundled as a fiber bundle, a sizing agent may be used. A sizing agent having at least one functional group selected from the group consisting of an epoxy group, a hydroxy group, an acrylate group, a methacrylate group, a carboxyl group, and a carboxylic anhydride group may be preferably used as the sizing agent of the carbon fibers. The reason for using the sizing agent is because an interaction such as a chemical bond between the functional group of the sizing agent present in the surface of the carbon fibers and the functional group in the polymer network in the resin cured product or a hydrogen bond occurs, enhancing the adhesion between the carbon fibers and the resin cured product.

The amount of the sizing agent that attaches to the carbon fibers differs depending on the combined matrix resin, but 0.01 to 5.00 mass % of the carbon fibers may be favorably used. If the attached amount is less than 0.01 mass %, the function as a sizing agent cannot be obtained in many cases, and if the attached amount exceeds 5.00%, the mechanical properties of the matrix resin such as heat resistance may be lost.

In the carbon fiber reinforced composite material of the present invention, the resin cured product formed by curing a resin composition has a higher-order structure, and thus surprisingly excellent mode I interlaminar toughness, mode II interlaminar toughness and tensile strength are expressed.

This is thought to be due to the need for much energy to destroy the higher-order structure of the resin cured product when a crack is developing inside the carbon fiber reinforced composite material.

The higher-order structure referred to here signifies a state in which the molecules are oriented and arranged after the curing or semi-curing of the resin composition, e.g., a state in which there is a crystal structure or a liquid crystal structure in the resin cured product. The presence of such a crystal structure or liquid crystal structure can be directly confirmed by observation with a polarizing microscope under a crossed Nicol prism or measured with an X-ray scattering method. If a crystal structure or a liquid crystal structure is present, the change in the storage elastic modulus of the epoxy resin cured product to temperature decreases relative to the temperature, making it possible to indirectly confirm the presence of the crystal structure or the liquid crystal structure by measuring the change in the storage elastic modulus.

The higher-order structure of the resin cured product is generally expressed in X-ray diffraction in the region where the diffraction angle $2\theta \geq 10°$. In the present invention, the diffraction angle $2\theta$ is in the range of $1.0°$ to $6.0°$ in the periodic structure (higher-order structure) based on the mesogenic structure (e.g., biphenyl group, terphenyl group, terphenyl analog group, anthracene group, or a group in which same is connected to an azomethine group or an ester group) present in the constituent element [B] and/or the constituent element [C], and Therefore, the resin cured product more easily takes a periodic structure and there is a tendency of improved resin toughness. It is important that the range of the peak diffraction angle $2\theta$ observed with X-ray diffraction be $1.0°$ to $6.0°$, and the range is preferably $2.0°$ to $4.0°$. The crystallite comprising a periodic structure is preferably larger as a larger size indicates that the resin cured product has a large structure with the molecules oriented and arranged. The maximum crystallite size is preferably at least 25 nm, more preferably at least 50 nm, and yet more preferably at least 100 nm.

The diffraction angle and the maximum crystallite size in the carbon fiber reinforced composite material of the present invention are numerical values measured according to the following conditions. The carbon fiber reinforced composite material formed to a thickness of 1 mm is used and a measurement sample with a length of 40 mm and a width of 10 mm is prepared. A wide-angle X-ray diffractometer is used to measure the prepared measurement sample according to the following conditions.

X-ray source: CuKα rays (tube voltage: 45 kV, tube current: 40 mA)
Detector: goniometer+monochromator+scintillation counter
Scanning range: $2\theta=1°$ to $90°$
Scanning mode: step scan, step unit: $0.1°$, calculation time: 40 sec.

The crystallite size is computed from the following Scherrer equation from the half width value found for the peak of the diffraction pattern that is obtained with X-ray diffraction and appears in the range of $2\theta=1°$ to $10°$. The maximum crystallite size here indicates the maximum crystallite size among 10 measured points in a sample.

$$\text{Crystal size (nm)} = K\lambda/\beta_0 \cos\theta_B$$

where:
K: 1.0
λ: 0.15418 nm (X-ray wavelength)
$\beta_o$: $(\beta_E^2 - \beta_1^2)^{1/2}$
$\beta_E$: apparent half width value (measured value) rad
$\beta_1$: $1.046 \times 10^{-2}$ rad
$\theta_B$: Bragg diffraction angle The X-ray diffraction measurements were made parallel) (0°), perpendicular (90°) and 45° to the carbon fiber axis inside the carbon fiber reinforced composite material.

The higher-order structure of the resin cured product may be oriented in any direction with respect to the carbon fibers of the constituent element [A], but if the higher-order structure of the resin cured product has a periodic structure only in the direction perpendicular to the carbon fiber axis, it may not be possible to observe a peak derived from the resin cured product with X-ray diffraction due to a strong peak derived from the graphite structure of the carbon fiber. In this case, X-ray diffraction measurement is made using the curing plate of the resin cured product with the carbon fibers removed to verify the presence of a periodic structure.

In the prepreg and carbon fiber reinforced composite material of the present invention, the resin cured product obtained by curing the resin composition containing the constituent elements [B] and [C] has an endothermic peak at a temperature of 250° C. or higher, preferably at 280° C. or higher and more preferably 300° C. or higher when the temperature is raised from 50° C. to 400° C. at a rate of 5° C./min in a differential scan calorimetric analysis under a nitrogen atmosphere. The endothermic peak is considered to be the endothermic peak when the liquid crystal structure formed in the resin curing product undergoes a phase transition. With the endothermic peak reaching such a temperature, the temperature range in which the resin cured product maintains a liquid crystal phase expands, and a resin cured product is obtained in which excellent mechanical properties can be expressed even at high temperatures. Because a stronger higher-order structure is formed with a higher liquid crystal phase transition temperature, the resin cured product and the carbon fiber reinforced composite material tend to express excellent mechanical properties. The curing conditions of the resin composition containing the constituent elements [B] and [C] are not particularly limited but can be adjusted, as appropriate, according to the resin composition and the curing agent used. To confirm the liquid crystallinity using differential scan calorimetric analysis, the resin cured product may be used or the carbon fiber reinforced composite material may be used.

The presence of the periodic structure in the resin cured product of the carbon fiber reinforced composite material of the present invention can be confirmed by observation using a polarizing microscope. In further detail, a periodic structure can be determined as being present when an interference pattern due to depolarization can be observed in a crossed Nicol state.

In the prepreg and the carbon fiber reinforced composite material of the present invention, the resin cured product preferably contains a resin region indicating molecular anisotropy after curing. The expression resin region having this molecular anisotropy indicates an oriented domain in which the molecules with a diameter of at least 1 μm are oriented and arranged. The higher-order structure contained in the resin cured product increases in size, resulting in a tendency for the oriented domain to increase in size. For confirmation, the polarization IR and the polarization Raman spectra are measured, varying the polarization azimuth between 0° and 150° at 30-degree intervals with any given azimuth set to 0°, at, for example, 5 to 10 locations in the resin region in the carbon fiber reinforced composite material, and the presence of a change in the signal intensity between polarization azimuths is checked. In a resin cured product without molecular anisotropy, no change in intensity can be seen between polarization azimuths.

The molding conditions of the carbon fiber reinforced composite material of the present invention are not limited but if the molding temperature is too high, high heat resistance is needed for the device and the auxiliary materials used, and the production costs of the carbon fiber reinforced composite material becomes high. If the molding temperature is too low, a long period of time is needed for the reaction of the constituent elements [B] and [C], which also has the possibility of increasing the production costs. The maximum temperature used in the molding is preferably 100 to 220° C. and more preferably 120 to 200° C.

Because the resin cured product in the carbon fiber reinforced composite material in the present invention has a higher-order structure, the constituent element [B] epoxy resin is preferably a so-called liquid crystalline epoxy resin having a mesogenic structure and indicating liquid crystallinity. The liquid crystallinity may be indicated by [B] alone or by combining the constituent element [C] or other components. The constituent elements [B] and [C] have mesogenic structures (e.g., biphenyl group, terphenyl group, terphenyl analog group, anthracene group, or a group in which same is connected to an azomethine group or an ester group), so a higher-order structure (also called a periodic structure) derived from that structure is formed.

If the constituent element [B] has a mesogenic structure, an epoxy resin having a structure represented by formula (1) is favorable.

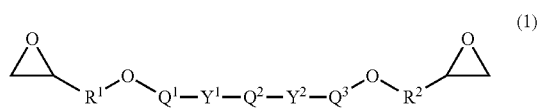

(1)

$Q^1$, $Q^2$ and $Q^3$ in the general formula (1) each contains one type of structure selected from a group (I). $R^1$ and $R^2$ in the general formula (1) each represents an alkylene group having a carbon number of 1 to 6. Each Z in the group (I) independently represents an aliphatic hydrocarbon group having a carbon number of 1 to 8, an aliphatic alkoxy group having a carbon number of 1 to 8, a fluorine atom, a chlorine atom, a bromine atom, an iodine atom, a cyano group, a nitro group, or an acetyl group. Each n independently represents an integer of 0 to 4. $Y^1$, $Y^2$ and $Y^3$ in the general formula (1) and the group (I) each represents at least one divalent group selected from a group (II) or a linking group comprising a single bond.

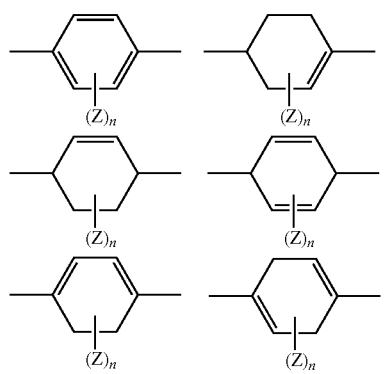

GROUP (I)

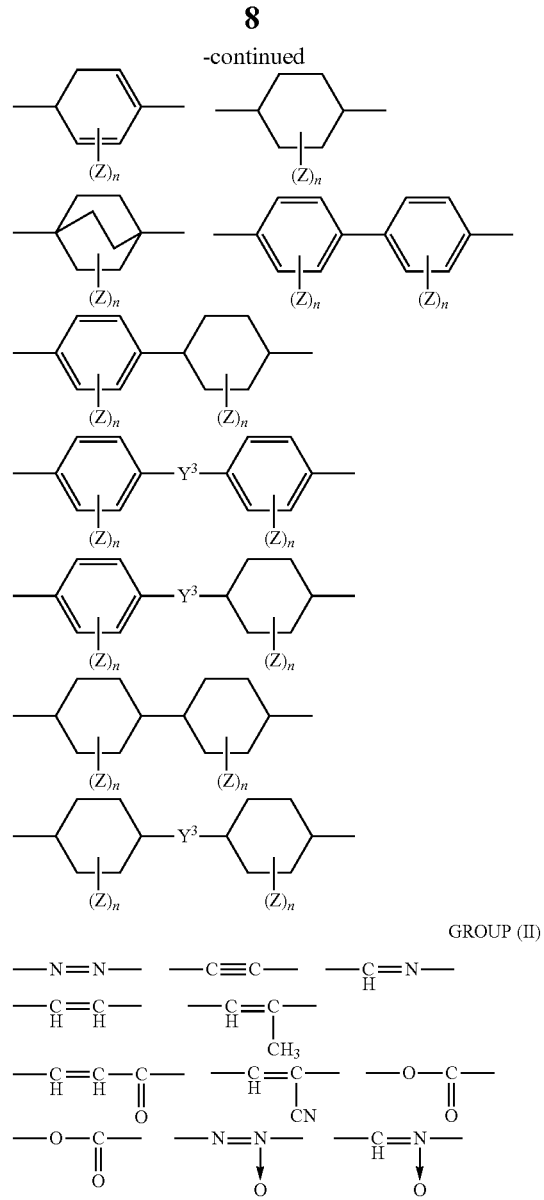

GROUP (II)

Each Z in the group (I) is preferably independently an aliphatic hydrocarbon group having a carbon number of 1 to 4, an aliphatic alkoxy group having a carbon number of 1 to 4, a fluorine atom, a chlorine atom, a bromine atom, an iodine atom, a cyano group, a nitro group, or an acetyl group, more preferably a methyl group, an ethyl group, a methoxy group, an ethoxy group, or a chlorine atom, and even more preferably a methyl group or an ethyl group. Each n in the group (I) is preferably independently an integer of 0 to 2 and more preferably 0 or 1.

A resin with many mesogenic structures in the constituent element [B] easily forms a higher-order structure after curing but if there are too many such mesogenic structures, the softening point rises and the handleability decreases. Therefore, the number of mesogenic structures in the general formula (1) is particularly preferably two. The significance of having two mesogenic structures is that with two mesogenic structures, there are three ring structures, such as benzene rings and cyclohexane rings, and each ring structure is bonded with a structure described in Chem. 3. The softening point in the present invention indicates the temperature when a sample cast in a ring is placed into a bath and the ball set in the sample crosses the optical sensor according to the ring-and-ball method stipulated in JIS-K7234 (1986).

$Q^1$, $Q^2$ and $Q^3$ in the general formula (1) each preferably contains a benzene ring, as the higher-order structure more easily forms due to the structure of the constituent element [B] becoming rigid, and there is an advantageous improvement in the toughness. $Q^1$, $Q^2$ and $Q^3$ in the general formula (1) each containing an aliphatic hydrocarbon is a preferable mode as the softening point lowers and the handleability improves. One kind of epoxy resin may be used in the constituent element [B] or two or more kinds may be combined.

The constituent element [B] can be produced with a known method with reference, for example, to the production methods described in Japanese Patent 4619770, Japanese Patent Application Laid-open No. 2010-241797, Japanese Patent Application Laid-open No. 2011-98952, Japanese Patent Application Laid-open No. 2011-74366 and Journal of Polymer Science: Part A: Polymer Chemistry, vol. 42, 3631(2004).

Specific examples of the constituent element [B] include 1,4-bis{4-(oxiranylmethoxy)phenyl}cyclohexane, 1-{3-methyl-4-(oxiranylmethoxy)phenyl}-4-{4-(oxiranylmethoxy)phenyl}cyclohexane, 1,4-bis{4-(oxiranylmethoxy)phenyl}-1-cyclohexene, 1-{3-methyl-4-(oxiranylmethoxy)phenyl}-4-{4-(oxiranylmethoxy)phenyl}-1-cyclohexene, 1-{2-methyl-4-(oxiranylmethoxy)phenyl}-4-{4-(oxiranylmethoxy)phenyl}-1-cyclohexene, 1-{3-ethyl-4-(oxiranylmethoxy)phenyl}-4-{4-(oxiranylmethoxy)phenyl}-1-cyclohexene, 1-{2-ethyl-4-(oxiranylmethoxy)phenyl}-4-{4-(oxiranylmethoxy)phenyl}-1-cyclohexene, 1-{3-n-propyl-4-(oxiranylmethoxy)phenyl}-4-{4-(oxiranylmethoxy)phenyl}-1-cyclohexene, 1-{3-isopropyl-4-(oxiranylmethoxy)phenyl}-4-{4-(oxiranylmethoxy)phenyl}-1-cyclohexene, 1,4-bis{4-(oxiranylmethoxy)phenyl}-2-cyclohexene, 1-{3-methyl-4-(oxiranylmethoxy)phenyl}-4-{4-(oxiranylmethoxy)phenyl}-2-cyclohexene, 1,4-bis{4-(oxiranylmethoxy)phenyl}-2,5-cyclohexadiene, 1-{3-methyl-4-(oxiranylmethoxy)phenyl}-4-{4-(oxiranylmethoxy)phenyl}-2,5-cyclohexadiene, 1,4-bis{4-(oxiranylmethoxy)phenyl}-1,5-cyclohexadiene, 1-{3-methyl-4-(oxiranylmethoxy)phenyl}-4-{4-(oxiranylmethoxy)phenyl}-1,5-cyclohexadiene, 1,4-bis{4-(oxiranylmethoxy)phenyl}-1,4-cyclohexadiene, 1-{3-methyl-4-(oxiranylmethoxy)phenyl}-4-{4-(oxiranyl)methoxy)phenyl}-1,4-cyclohexadiene, 1,4-bis{4-(oxiranylmethoxy)phenyl}-1,3-cyclohexadiene, 1-{3-methyl-4-(oxiranylmethoxy)phenyl}-4-{4-(oxiranylmethoxy)phenyl}-1,3-cyclohexadiene, 1,4-bis{4-(oxiranylmethoxy)phenyl}benzene, 1-{3-methyl-4-(oxiranylmethoxy)phenyl}-4-{4-(oxiranylmethoxy)phenyl}benzene, 1,4-phenylene-bis{4-(2,3-epoxypropoxy)benzoate}, 1,4-phenylene-bis{4-(2,3-epoxypropoxy)-2-methylbenzoate}, 1,4-phenylene-bis{4-(2,3-epoxypropoxy)-3-methylbenzoate}, 1,4-phenylene-bis{4-(2,3-epoxypropoxy)-3,5-dimethylbenzoate}, 1,4-phenylene-bis{4-(2,3-epoxypropoxy)-2,6-dimethylbenzoate}, 2-methyl-1,4-phenylene-bis{4-(2,3-epoxypropoxy)benzoate}, 2-methoxy-1,4-phenylene-bis(4-hydroxybenzoate), 2-methyl-1,4-phenylene-bis{4-(2,3-epoxypropoxy)-2-methylbenzoate}, 2-methyl-1,4-phenylene-bis{4-(2, 3-epoxypropoxy)-3-methylbenzoate}, 2-methyl-1,4-phenylene-bis{4-(2,3-epoxypropoxy)-3,5-dimethylbenzoate}, 2-methyl-1,4-phenylene-bis{4-(2,3-epoxypropoxy)-2,6-dimethylbenzoate}, 2,6-dimethyl-1,4-phenylene-bis{4-(2,3-epoxypropoxy)benzoate}, 2,6-dimethyl-1,4-phenylene-bis{4-(2, 3-epoxypropoxy)-3-methylbenzoate}, 2,6-dimethyl-1, 4-phenylene-bis{4-(2,3-epoxypropoxy)-3,5-dimethylbenzoate}, 2,3,6-trimethyl-1,4-phenylene-bis{4-(2,3-epoxypropoxy)benzoate}, 2,3,6-trimethyl-1,4-phenylene-bis{4-(2,3-epoxypropoxy)-2,6-dimethylbenzoate}, 2,3,5,6-tetramethyl-1,4-phenylene-bis{4-(2,3-epoxypropoxy)benzoate}, 2,3,5,6-tetramethyl-1,4-phenylene-bis{4-(2,3-epoxypropoxy)-3-methylbenzoate}, 2,3,5,6-tetramethyl-1,4-phenylene-bis{4-(2,3-epoxypropoxy)-3,5-dimethylbenzoate}, 2-methyl-1,4-phenylene-bis{4-(3-oxa-5,6-epoxyhexyloxy)benzoate}, 1-{4-(2,3-epoxypropoxy)phenyl}cyclohexyl-4-(2,3-epoxypropoxy)benzoate, 1-{4-(2,3-epoxypropoxy)phenyl}cyclohexyl-4-(2,3-epoxypropoxy)-2-methylbenzoate, 1-{4-(2,3-epoxypropoxy)phenyl}cyclohexyl-4-(2,3-epoxypropoxy)-3-methylbenzoate, 1-{4-(2,3-epoxyproxy)phenyl}cyclohexyl-4-(2,3-epoxypropoxy)-3-ethylbenzoate, 1-{4-(2,3-epoxypropoxy)phenyl}cyclohexyl-4-(2,3-epoxypropoxy)-2-isopropylbenzoate, 1-{4-(2,3-epoxypropoxy)phenyl}cyclohexyl-4-(2,3-epoxypropoxy)-3,5-dimethylbenzoate, 1,4-bis{4-(3)-oxa-5,6-epoxyhexyloxy)phenyl}-1-cyclohexene, 1-{4-(3-oxa-5,6-epoxyhexyloxy)-3-methylphenyl}-4-{4-(3-oxa-5,6-epoxyhexyloxy)phenyl}-1-cyclohexene, 1,4-bis{4-(5-methyl-3-oxa-5,6-epoxyhexyloxy)phenyl}-1-cyclohexene, 1-{4-(5-methyl-3-oxa-5,6-epoxyhexyloxy)-3-methylphenyl}-4-{4-(5-methyl-3-oxa-5,6-epoxyhexyloxy)phenyl}-1-cyclohexene, 1,4-bis{4-(4-methyl-4,5-epoxypentyloxy)phenyl}-1-cyclohexene, 1,4-bis{4-(3-oxa-5,6-epoxyhexyloxy)phenyl}benzene, 1-{4-(3-oxa-5,6-epoxyhexyloxy)-3-methylphenyl}-4-{4-(3-oxa-5,6-epoxyhexyloxy)phenyl}benzene, 1,4-bis{4-(5-methyl-3-oxa-5,6-epoxyhexyloxy)phenyl}benzene, 1-{4-(5-methyl-3-oxa-5,6-epoxyhexyloxy)-3-methylphenyl}-4-{4-(5-methyl-3-oxa-5,6-epoxyhexyloxy)phenyl}benzene, 1,4-bis{4-(4-methyl-4,5-epoxypentyloxy)phenyl}benzene, 1,4-bis{4-(3-oxa-5,6-epoxyhexyloxy)phenyl}cyclohexane, 1-{4-(3-oxa-5,6-epoxyhexyloxy)-3-methylphenyl}-4-{4-(3-oxa-5,6-epoxyhexyloxy)phenyl}cyclohexane, 1,4-bis{4-(5-methyl-3-oxa-5,6-epoxyhexyloxy)phenyl}cyclohexane, 1-{4-(5-methyl-3-oxa-5,6-epoxyhexyloxy)-3-methylphenyl}-4-{4-(5-methyl-3-oxa-5,6-epoxyhexyloxy)phenyl}cyclohexane, and 1,4-bis{4-(4-methyl-4,5-epoxypentyloxy)phenyl}cyclohexane, and among them, 1-(3-methyl-4-oxiranylmethoxyphenyl)-4-(4-oxiranylmethoxyphenyl)-1-cyclohexene,2-methyl-1,4-phenylene-bis{4-(2,3-epoxy propoxy)benzoate}, 1-{4-(2,3-epoxypropoxy)phenyl}cyclohexyl-4-(2,3-epoxypropoxy)benzoate, 1-{4-(2,3-epoxypropoxy)phenyl}cyclohexyl-4-(2,3-epoxypropoxy)-3-methyl benzoate are particularly preferred from the viewpoint of the formation of a higher-order structure after curing, the handleability and the availability of raw materials.

The constituent element [B] epoxy resin optionally contains a prepolymer that is partially polymerized with a curing agent or the like. The constituent element [B] epoxy resin easily crystallizes and often requires a high temperature for impregnation into the carbon fibers. Using a prepolymer in which at least a portion of the constituent element [B] epoxy resin is polymerized is a favorable mode as the handleability improves due to a tendency of the crystallization to be suppressed.

As a method for partially polymerizing the constituent element [B] epoxy resin, the polymerization may be carried out with an anionic polymerization catalyst, i.e., a tertiary amine or an imidazole, or a cationic polymerization catalyst, i.e., a Lewis acid such as a boron trifluoride-amine complex, or a prepolymerization agent having a functional group that is reactive with epoxy resin may be used. When partially polymerizing the constituent element [B] epoxy resin, the method of using a prepolymerization agent is favorable due to the ease of controlling the molecular weight of the prepolymer produced. If the prepolymer molecular weight is too high, the crosslink density of the resin in the carbon fiber reinforced composite material drops, and there is a risk of losing the heat resistance and mechanical properties.

The prepolymerization agent for partially polymerizing the constituent element [B] epoxy resin is not particularly limited as long as the prepolymerization agent is a compound having two to four active hydrogen atoms reactive with epoxy resin. Examples include a phenol compound, an amine compound, an amide compound, a sulfide compound, and an acid anhydride. The active hydrogen refers to a highly reactive hydrogen atom bonded to nitrogen, oxygen or sulfur in an organic compound. If there is one active hydrogen, the crosslink density of the epoxy resin cured product using the prepolymer drops and there is the possibility lowered heat resistance and mechanical properties. If there are five or more active hydrogen groups, it is difficult to control the reaction when the constituent element [B] epoxy resin prepolymerizes, and there is the possibility of gelling. A phenol compound having two or three active hydrogens is particularly suitable as the prepolymerization agent from the viewpoint of controlling gelling in the prepolymerization reaction and prepolymer storage stability.

Among phenol compounds having two to four active hydrogens, a phenol compound having one or two benzene rings is suitable because of the tendency of the higher-order structure to form easily and the toughness to improve due to a rigid prepolymer structure of the constituent element [B] epoxy resin, and also because the viscosity of a resin composition containing the prepolymer of the constituent element [B] epoxy resin, the constituent element [B] epoxy resin and the constituent element [C] curing agent can be curbed and the handleability improves.

Examples of the phenol compound having two or three active hydrogens include catechol, resorcinol, hydroquinone, bisphenol A, bisphenol F, bisphenol G, bisphenol Z, tris(4-hydroxyphenyl)methane and derivatives thereof. Examples of the derivatives include a compound with an alkyl group or the like having a carbon number of 1 to 8 substituted in the benzene ring. One of such phenol compounds may be used alone or two or more may be used in combination.

The molecular weight of the prepolymer contained in the constituent element [B] is not particularly limited. From the perspective of fluidity of the resin composition, the number average molecular weight is preferably 15000 or less, preferably 10000 or less and yet more preferably 350 to 5000. The number average molecular weight of the present invention indicates the molecular weight calculated with standard polystyrene using gel permeation chromatography (GPC, also known as size exclusion chromatography, or SEC). The number average molecular weight of the entire constituent element [B] contained in the prepreg and the carbon fiber composite material of the present application is favorably 10000 or less, favorably 5000 or less and even more favorably 250 to 3500. The number average molecular weight refers to the value measured from all the peaks derived from [B] when there is a large molecular weight difference in the monomer and prepolymer of [B] and there are at least two peaks in GPC.

The method for prepolymerizing by partially polymerizing the constituent element [B] epoxy resin is not particularly limited, but may be carried out, for example, by melting the constituent element [B] and the prepolymerization agent in a synthetic solvent, and stirring while applying heat to synthesize. A catalyst is optionally used within a scope such that there is no gelling during the prepolymerization reaction. Although synthesis is possible without using a solvent, the constituent element [B] has a high melting point and a high temperature is needed in a prepolymerization reaction without a solvent, so a synthesis method that uses a synthesis solvent is preferable from the viewpoint of safety.

When the constituent element [B] contains a prepolymer, the handleability improves due to the tendency to suppress crystallization, but if the prepolymer content is too high, the melt viscosity of the resin composition containing the constituent element [B] and the constituent element [C] curing agent increases excessively and impregnation into the carbon fibers may be difficult. If the constituent element [B] contains a prepolymer, the content thereof is preferably 80 parts by mass or less and more preferably in the range of 5 to 60 parts by mass to 100 parts by mass of the total of the epoxy resin and the prepolymer in the constituent element [B]. The ratio of the area of the peaks derived from the prepolymer occupying the area of the peaks derived from all of the epoxy resin in the resin composition (area of the peaks derived from the prepolymer/area of the peaks derived from all of the epoxy resin in the resin composition) in the GPC and high performance liquid chromatography (HPLC) measurements is preferably 0.80 or less and more preferably in the range of 0.05 to 0.60. In the prepreg of the present invention, all of the components, including at least the constituent element [B] and the constituent element [C] except for the constituent element [A] are referred to as the "resin composition." In explanations where a particular differentiation is made, the resin composition may also be referred to as "the resin composition comprising all of the components except for the constituent element [A]." As described below, the resin composition of the present invention may also contain, for example, a filler or a thermoplastic resin that can be dispersed in the constituent element [B].

The resin composition of the present invention containing the constituent element [B] and the constituent element [C] preferably transitions from the crystal phase to the liquid crystal phase or an anisotropic liquid at temperatures under 180° C. By setting the temperature for transitioning from the crystal phase to the liquid crystal phase or an anisotropic liquid to less than 180° C., the fluidity of the resin composition when molding the carbon fiber reinforced composite material improves and the impregnability into the carbon fiber improves, so that a carbon fiber reinforced composite material can be easily obtained with fewer voids and other defects.

The prepreg and the carbon fiber reinforced composite material of the present invention optionally contains, in addition to the constituent element [B] epoxy resin, a thermosetting resin, a copolymer of an epoxy resin and a thermosetting resin, or the like. Examples of the thermosetting resin include an unsaturated polyester resin, a vinyl ester resin, an epoxy resin, a benzoxazine resin, a phenol resin, a urea resin, a melamine resin, and a polyimide resin. The thermosetting resin and the copolymer may be used alone or mixed together, as appropriate. Mixing the thermosetting resin or the like with the constituent element [B] epoxy resin improves the fluidity of the resin composition and the heat resistance of the resin cured product.

Among the epoxy resins used as the constituent element [B] other than epoxy resins having a structure represented by the general formula (1), a glycidyl ether epoxy resin having phenol as the precursor may be favorably used as a bifunctional epoxy resin. Examples of such an epoxy resin include a bisphenol A epoxy resin, a bisphenol F epoxy resin, a bisphenol S epoxy resin, a naphthalene epoxy resin, a biphenyl epoxy resin, a urethane-modified epoxy resin, and hydantoin and resorcinol epoxy resins.

The bisphenol A epoxy resin, the bisphenol F epoxy resin and the resorcinol epoxy resin in a liquid form have a low viscosity and are Therefore, preferably used in combination with another epoxy resin.

The bisphenol A epoxy resin in a solid form provides a structure with a lower crosslink density than the liquid bisphenol A epoxy resin and Therefore, has a lower heat resistance, but is used in combination with a glycidylamine epoxy resin, a liquid bisphenol A epoxy resin or a bisphenol F epoxy resin in order to obtain a structure with a higher toughness.

An epoxy resin having a naphthalene skeleton provides a curing resin with a low water absorption coefficient and a high heat resistance. A bisphenol epoxy resin, a dicyclopentadiene epoxy resin, a phenol aralkyl epoxy resin or a diphenylfluorene epoxy resin provides a curing resin with a low water absorption coefficient and is Therefore, suitably used. A urethane-modified epoxy resin or an isocyanate-modified epoxy resin provides a curing resin with a high fracture toughness and ductility.

Examples of the bisphenol A epoxy resin that are commercially available include "jER (registered trademark)" 825 (manufactured by Mitsubishi Chemical Corporation), "EPICLON (registered trademark)" 850 (manufactured by DIC Corporation), "Epotohto (registered trademark)" YD-128 (manufactured by Tohto Kasei Co., Ltd.), and DER-331 and DER-332 (both manufactured by The Dow Chemical Company).

Examples of the bisphenol F epoxy resin that are commercially available include "jER (registered trademark)" 806, "jER (registered trademark)" 807 and "jER (registered trademark)" 1750 (all manufactured by Mitsubishi Chemical Corporation), "EPICLON (registered trademark)" 830 (manufactured by DIC Corporation), and "Epotohto (registered trademark)" YD-170 (manufactured by Tohto Kasei Co., Ltd.)

Examples of the resorcinol epoxy resin that are commercially available include "Denacol (registered trademark)" EX-201 (manufactured by Nagase ChemteX Corporation).

Examples of the glycidyl aniline epoxy resin that are commercially available include GAN and GOT (both manufactured by Nippon Kayaku Co., Ltd.)

Examples of the biphenyl epoxy resin that are commercially available include NC-3000 (manufactured by Nippon Kayaku Co., Ltd.)

Examples of the urethane-modified epoxy resin that are commercially available include AER4152 (manufactured by Asahi Kasei Corporation).

Examples of the hydantoin epoxy resin that are commercially available include AY238 (manufactured by Huntsman Advanced Materials).

Among the epoxy resins used as the constituent element [B] other than epoxy resins having a structure represented by the general formula (1), examples of a glycidyl amine epoxy resin having at least three functional groups include diaminodiphenylmethane, diaminodiphenyl sulfone, aminophenol, meta-xylenediamine, 1,3-bisaminomethylcyclohexane and isocyanurate epoxy resins. Among these, diaminodiphenylmethane and aminophenol epoxy resins are used particularly favorably from the viewpoint of the physical properties being well balanced.

Examples of the glycidyl ether epoxy resin with at least three functional groups include phenol novolac, ortho-cresol novolac, tris-hydroxyphenyl methane and tetraphenylol ethane epoxy resins.

Examples of the diaminodiphenylmethane epoxy resin that are commercially available and have at least three functional groups include ELM434 (manufactured by Sumitomo Chemical Co., Ltd.), "jER (registered trademark)" 604 (manufactured by Mitsubishi Chemical Corporation), "Araldite (registered trademark)" MY720, "Araldite (registered trademark)" MY721, "Araldite (registered trademark)" MY9512 and "Araldite (registered trademark)" MY9663 (all manufactured by Huntsman Advanced Materials), and "Epotohto (registered trademark)" YH-434 (manufactured by Tohto Kasei Co., Ltd.)

Examples of the meta-xylenediamine epoxy resin that are commercially available include TETRAD-X (manufactured by MITSUBISHI GAS CHEMICAL COMPANY, INC.)

Examples of the 1,3-bisaminomethylcyclohexane epoxy resin that are commercially available include TETRAD-C (manufactured by MITSUBISHI GAS CHEMICAL COMPANY, INC.)

Examples of the isocyanurate epoxy resin that are commercially available include TEPIC-P (manufactured by Nissan Chemical Corporation).

Examples of the tris-hydroxyphenyl methane epoxy resin that are commercially available include Tactix 742 (manufactured by Huntsman Advanced Materials).

Examples of the tetraphenylol ethane epoxy resin that are commercially available include "jER (registered trademark)" 10315 (manufactured by Japan Epoxy Resin Co., Ltd.)

Examples of the aminophenol epoxy resin that are commercially available include "jER (registered trademark)" 630 (manufactured by Japan Epoxy Resin Co., Ltd.), "Araldite (registered trademark)" MY0510 (manufactured by Huntsman, Inc.), "Araldite (registered trademark)" MY0600 (manufactured by Huntsman, Inc.) and "Araldite (registered trademark)" MY0610 (manufactured by Huntsman, Inc.)

Examples of the phenol novolac epoxy resin that are commercially available include DEN431 and DEN438 (both manufactured by The Dow Chemical Company), and "jER (registered trademark)" 152 (manufactured by Japan Epoxy Resin Co., Ltd.)

Examples of the ortho-cresol novolac epoxy resin that are commercially available include EOCN-1020 (Nippon Kayaku Co., Ltd.) and "EPICLON (registered trademark)" N-660 (manufactured by DIC Corporation).

Examples of the dicyclopentadiene epoxy resin that are commercially available include "EPICLON (registered trademark)" HP7200 (manufactured by DIC Corporation).

When the resin composition of the present invention containing the constituent elements [B] and [C] contains an epoxy resin or a thermosetting resin other than epoxy resins having a structure represented by the general formula (1), the amount of the epoxy resin or the thermosetting resin used is preferably 50 parts by mass or less, more preferably 30 parts by mass or less and yet more preferably 10 parts by mass or less to 100 parts by mass of the total of all the epoxy resins (including the epoxy resin represented by the general formula (1) and other epoxy resins) of the constituent element [B], the epoxy resin prepolymer and the thermosetting resin.

The constituent element [C] curing agent of the present invention is a curing agent for an epoxy resin and a compound having an active group that can react with an epoxy group. Specific examples of the curing agent include dicyandiamide, an aromatic polyamine, an aminobenzoic acid ester, an acid anhydride, a phenol novolac resin, a cresol novolac resin, a polyphenol compound, an imidazole derivative, an aliphatic amine, a tetramethylguanidine, a thiourea addition amine, a carboxylic acid anhydride such as methylhexahydrophthalic anhydride, a carboxylic acid amide, an organic acid hydrazide, a Lewis acid complex such as polymercaptan and a boron trifluoride ethylamine complex. These curing agents may be used alone or two or more used in combination.

Using an aromatic polyamine as the curing agent is preferable as an epoxy resin cured product with favorable heat resistance is obtained. Among aromatic polyamines, isomers of diaminodiphenyl sulfone are particularly favorable curing agents as a fiber reinforcing composite material with favorable heat resistance is obtained.

By using a combination of dicyandiamide and a urea compound, i.e., 3,4-dichlorophenyl-1,1-dimethylurea, or an imidazole as the curing agent, a high heat resistance and water resistance can be obtained while curing at a relatively low temperature. Curing the epoxy resin with an acid anhydride provides a cured product with a lower water absorption coefficient than amine compound curing. By using these curing agents in a latent agent form, e.g., a microencapsulated form, the storage stability and, in particular, the tackiness and the drapability, of the prepreg hardly change even when the prepreg is left at room temperature.

The optimal addition amount of the curing agent differs depending on the type of the epoxy resin and the curing agent. For example, adding the stoichiometric equivalence of an aromatic polyamine curing agent is favorable, but setting the ratio of the amount of active hydrogen in the aromatic amine curing agent to the amount of the epoxy group in the epoxy resin to between 0.7 and 1.0 is a favorable mode in which a resin is obtained with a higher elastic modulus than using the equivalence. Setting the ratio of the amount of active hydrogen in the aromatic polyamine curing agent to the amount of the epoxy group in the epoxy resin to between 1.0 and 1.6 is also a favorable mode in which a resin is obtained with a high ductility in addition to an improved curing rate. Accordingly, the ratio of the amount of the active hydrogen in the curing agent to the amount of the epoxy group in the epoxy resin is favorably in the range of 0.7 to 1.6.

Examples of the aromatic polyamine curing agent that are commercially available include SEIKACURE-S (manufactured by Wakayama Seika Kogyo Co., Ltd.), MDA-220 (manufactured by Mitsui Chemicals, Inc.), "jER Cure (registered trademark)" W (manufactured by Japan Epoxy Resin Co., Ltd.), 3,3'-DAS (manufactured by Mitsui Chemicals, Inc.), "Lonzacure (registered trademark)" M-DEA (manufactured by Lonza), "Lonzacure (registered trademark)" M-DIPA (manufactured by Lonza), "Lonzacure (registered trademark)" M-MIPA (manufactured by Lonza) and "Lonzacure (registered trademark)" DETDA80 (manufactured by Lonza).

Examples of the dicyandiamide that are commercially available include DICY-7 and DICY-15 (both manufactured by Mitsubishi Chemical Corporation). Examples of derivatives of the dicyandiamide include a compound bonded to dicyandiamide, a reaction product of the epoxy resin, and a reaction product of a vinyl compound or an acrylic compound.

The curing agents are optionally used in combination with a curing accelerator or another epoxy resin curing agent. Examples of the curing accelerant to be used in combination include a urea, an imidazole and a Lewis acid catalyst.

Examples of the urea compound include N,N-dimethyl-N'-(3,4-dichlorophenyl)urea, toluene bis (dimethyl urea), 4,4'-methylene bis (phenyl dimethyl urea) and 3-phenyl-1,1-dimethylurea. Examples of the urea compound that are commercially available include DCMU99 (manufactured by Hodogaya Chemical Co., Ltd.) and "Omicure (registered trademark)" 24, 52 and 94 (all manufactured by CVC Specialty Chemicals, Inc.)

Examples of the imidazole that are commercially available include 2MZ, 2PZ and 2E4MZ (all manufactured by Shikoku Chemicals Corporation). Examples of the Lewis acid catalyst include complexes of a boron trihalide and a base, such as a boron trifluoride piperidine complex, a boron trifluoride monoethylamine complex, a boron trifluoride triethanolamine complex and a boron trifluoride octylamine complex.

Favorable examples of the organic acid hydrazide compound include 3-hydroxy-2-naphthoic acid hydrazide, 2,6-naphthalenedicarbodihydrazide, salicylic acid hydrazide, terephthalic acid dihydrazide, and isophthalic acid dihydrazide from the viewpoint of curing acceleration and storage stability. Two or more of these organic acid hydrazide compounds may be mixed together for use, as needed. Examples of the organic acid hydrazide compound that are commercially available include 2,6-naphthalenedicarbodihydrazide (manufactured by Japan Finechem, Inc.) and isophthalic acid dihydrazide (manufactured by Otsuka Chemical Co., Ltd.)

These epoxy resins, curing agents or a portion thereof that has undergone a preliminary reaction may also be mixed into the resin composition. Doing so may effectively adjust the viscosity or improve the storage stability.

In the present invention, a thermoplastic resin can be mixed or melted for use in the resin composition containing the constituent elements [B] and [C]. A thermoplastic resin is favorably used because doing so makes it possible to control the tackiness of the resulting prepreg and control the fluidity of the resin composition when the carbon fiber reinforced composite material is molded. Favorable examples of such a thermoplastic resin include a thermoplastic resin having, in general, a bond selected from the group consisting of a carbon-carbon bond, an amide bond, an imide bond, an ester bond, an ether bond, a carbonate bond, a urethane bond, a thioether bond, a sulfone bond and a carbonyl bond in the main chain. The thermoplastic resin optionally has a partial crosslinked structure and may be crystalline or non-crystalline. In particular, the thermoplastic resin is at least one resin selected from the group consisting of polyamides, polycarbonates, polyacetals, polyphenylene oxides, polyphenylene sulfides, polyarylates, polyesters, polyamideimides, polyimides, polyetherimides, polyimides having a phenyltrimethylindan structure, polysulfones, polyethersulfones, polyether ketones, polyether ether ketones, polyaramides, polyether nitriles, and polybenzimidazoles, and is suitably mixed or melted into any of the epoxy resins contained in the resin composition.

Among these, the thermoplastic resin has a glass transition temperature (Tg) of at least 150° C. and preferably at least 170° C. to obtain favorable heat resistance. If the glass transition temperature of the thermoplastic resin used is less than 150° C., deformation easily occurs due to heat during use as a molded body. Favorable examples of the terminal functional group of the thermoplastic resin include a hydroxy group, a carboxyl group, a thiol group and an acid anhydride that can react with a cationically polymerizable compound. Specific examples include "SUMIKAEXCEL (registered trademark)" PES 3600P, "SUMIKAEXCEL (registered trademark)" PES 5003P, "SUMIKAEXCEL (registered trademark)" PES 5200P and "SUMIKAEXCEL (registered trademark)" PES 7600P (all manufactured by Sumitomo Chemical Co., Ltd.), and "Virantage (registered trademark)" VW-10200RFP and "Virantage (registered trademark)" VW-10700RFP (both manufactured by Solvay Advanced Polymers, L.L.C.), which are polyethersulfones that are commercially available, a copolymer oligomer of a polyethersulfone and a polyether ether sulfone such as described in Publication of Japanese Translation of PCT Application No. 2004-506789, and "Ultem (registered trademark)" 1000, "Ultem (registered trademark)" 1010 and "Ultem (registered trademark)" 1040 (all manufactured by Solvay Advanced Polymers, L.L.C.), which are commercially available polyetherimides. The term oligomer refers to a polymer with a limited number of monomers bonded, around 10 to 100, and a relatively low molecular weight.

In the present invention, an elastomer may be further mixed into the resin composition containing the constituent elements [B] and [C]. Such an elastomer is used with the object of forming a fine elastomer phase inside the epoxy matrix phase after curing. By doing so, it is possible to eliminate, by means of cavitation of the elastomer phase, planar strain produced when there is a stress load on the resin cured product, and plastic deformation is induced in the epoxy matrix phase, resulting in a large energy absorption and leading to a further improvement in the interlaminar toughness in the carbon fiber reinforced composite material.

The term elastomer refers to a polymer material having a domain with a glass transition temperature lower than 20° C., and examples include a liquid rubber, a solid rubber, crosslinked rubber particles, core shell rubber particles, a thermoplastic elastomer, and a block copolymer having a block with a glass transition temperature lower than 20° C. Among these, it is preferable to select from the block copolymer having a block with a glass transition temperature lower than 20° C. and the rubber particles as the elastomer. By doing so, it is possible to introduce a fine elastomer phase while minimizing the elastomer compatibility with the epoxy resin, and Therefore, the interlaminar toughness of the carbon fiber reinforced composite material can be greatly improved while curbing drops in the heat resistance and the elastic modulus.

Crosslinked rubber particles and core shell rubber particles formed by graft-polymerizing, onto the surface of crosslinked rubber particles, a different type of polymer are favorably used as the rubber particles from the viewpoint of handleability. The primary grain size of the rubber particles is preferably in the range of 50 to 300 µm and particularly preferably in the range of 80 to 200 µm. Such rubber particles preferably have affinity with the epoxy resin used and do not produce secondary aggregation during resin preparation and mold curing.

Examples of the crosslinked rubber particles that are commercially available include FX501P (manufactured by Japan Synthetic Rubber Industry) comprising a crosslinked substance of a carboxyl-modified butadiene-acrylonitrile copolymer, the CX-MN Series (manufactured by NIPPON SHOKUBAI CO., LTD.) comprising acrylic rubber fine particles, and the YR-500 series (manufactured by Nippon Steel & Sumikin Chemical Co., Ltd.)

Examples of the core shell rubber particles that are commercially available include "PARALOID (registered trademark)" EXL-2655 (manufactured by KUREHA CORPORATION) comprising a butadiene-alkyl methacrylate-styrene copolymer, "STAPHYLOID (registered trademark)" AC-3355 and TR-2122 (manufactured by Takeda Pharmaceutical Company Limited) comprising an acrylate ester-methacrylate ester copolymer, "PARALOID (registered trademark)" EXL-2611 and EXL-3387 (manufactured by Rohm and Haas) comprising a butyl acrylate-methyl methacrylate copolymer, and the "KaneAce (registered trademark)" MX series (manufactured by KANEKA CORPORATION).

In the present invention, thermoplastic resin particles may be suitably mixed into the resin composition of the present invention. By mixing in thermoplastic resin particles, the toughness and the impact resistance of the resin cured product are improved in the carbon fiber reinforced composite material.

A thermoplastic resin such as those exemplified above may be used as the thermoplastic resin particles mixed or melted into the resin composition as the raw material of the thermoplastic resin particles used in the present invention. A thermoplastic resin that maintains form in particles is preferable from the viewpoint of providing stable adhesive strength and impact resistance when used in the carbon fiber reinforced composite material. Among the thermoplastic resins, a polyamide is the most preferable, and among polyamides, polyamide 12, polyamide 11, polyamide 6, polyamide 66, a polyamide 6/12 copolymer, and the polyamide made into a semi-interpenetrating polymer network polyamide (semi-IPN polyamide) in an epoxy compound described in the first to seventh embodiments in Japanese Patent Application Laid-open No. 2009-221460 can be suitably used. The thermoplastic resin particles may be spherical or non-spherical in form and may be porous, but a spherical form is preferable in that the viscosity is excellent since there is no drop in the fluidity property of the resin, and that high impact resistance is provided since there is no starting point for stress concentration.

Examples of the polyamide particles that are commercial available include SP-500, SP-10, TR-1, TR-2, 842P-48 and 842P-80 (all manufactured by Toray Industries, Inc.), "Orgasol (registered trademark)" 1002D, 2001UD, 2001EXD, 2002D, 3202D, 3501D and 3502D, (all manufactured by ARKEMA K.K.), "Grilamid (registered trademark)" TR90 (manufactured by Emuzaberuke, Inc.), and "TROGAMID (registered trademark)" CX7323, CX9701 and CX9704 (manufactured by Degusa, Inc.) These polyamide particle products may be used alone or two or more used in combination.

The resin composition of the present invention can also use, within a scope that does not impede the effect of the present invention, a coupling agent, thermosetting resin particles, or an inorganic filler, i.e., a silica gel, carbon black, a clay, carbon nanotubes, or a metal powder.

In the prepreg and the carbon fiber reinforced composite material of the present invention, carbon fibers are used mainly as the reinforcing fiber and are 40 to 90 mass % and more preferably 50 to 80 mass %. If the mass percentage of the carbon fibers is too low, the mass of the resulting carbon fiber reinforced composite material may become excessive, and the advantages of the carbon fiber reinforced composite material in excellent specific strength and specific elastic modulus lost. If the mass percentage of the carbon fibers is too high, defects occur in the resin composition impregnation, many voids are formed easily in the resulting carbon fiber reinforced composite material, and the mechanical properties may greatly drop.

The prepreg of the present invention is suitably manufactured using a method such as a wet method in which the resin composition is melted in a solvent such as methyl ethyl ketone or methanol to reduce the viscosity and the result is impregnated into the carbon fibers, or a hot-melt method in which the resin composition is heated to lower the viscosity and the result is impregnated into the carbon fibers.

In the wet method, the carbon fibers are immersed in a solution of the resin composition and then removed, and the solvent is evaporated using an oven or the like to obtain the prepreg.

In the hot-melt method, the resin composition with the viscosity lowered by heating is directly impregnated into the carbon fibers, or a resin film in which the resin composition is coated onto a release paper or the like is produced, then the resin film is superimposed on one or both sides of the carbon fibers, and the resin composition is transferred and impregnated by heat-pressurization to obtain the prepreg. The hot-melt method is preferable because there is no substantial residual solvent in the prepreg.

When the prepreg is produced with the hot-melt method, the minimum viscosity of the resin composition measured with the following method is preferably 0.01 to 30 Pa·s. The minimum viscosity of the resin composition refers to the lowest value, within a temperature range of 40 to 180° C., of a complex viscosity η* measured with a dynamic viscoelasticity measuring apparatus (ARES manufactured by TA Instruments) using parallel plates with a frequency of 0.5 Hz and a plate interval of 1 mm while raising the temperature at a rate of 2° C./min.

The prepreg of the present invention preferably has a carbon fiber quantity per unit area of 50 to 1000 g/m². If the carbon fiber quantity is less than 50 g/m², then many laminations may be needed to obtain the prescribed thickness when molding the carbon fiber reinforced composite material, making the operation complicated. If the carbon fiber amount exceeds 1000 g/m², the drapability of the prepreg tends to be poor.

An example of how the carbon fiber reinforced composite material of the present invention may be produced is to laminate the prepreg of the present invention into the prescribed form, and then mold by heating and pressurizing. Examples of the method used for imparting heat and pressure include press-molding, autoclave molding, bag molding, wrapping tape application and internal pressure molding. The molding of sporting goods in particular is preferably carried out with the wrapping tape method or the internal pressure molding method.

In the wrapping tape method, the prepreg is wound onto a mandrel or other core metal and a tubular body is molded from the carbon fiber reinforced composite material, and the wrapping tape method is suitably used when producing a rod-like body such as a golf shaft or a fishing rod. More specifically, the prepreg is wound onto a mandrel, wrapping tape comprising a thermoplastic resin film is wound onto the outside of the prepreg to affix the prepreg and impart pressure, the resin composition is heated and cured in an oven, and then the core is removed to obtain a tubular body.

In the internal pressure molding method, a preform in which the prepreg is wound onto an internal-pressure imparting body such as a tube made of thermoplastic resin is placed into a mold, then a high-pressure gas is introduced into the internal-pressure imparting body to impart pressure while simultaneously heating the mold to form a tubular body. The internal pressure molding method is particularly favorably used when molding a complicated form such as a golf shaft, a bat, or a tennis or badminton racket.

The carbon fiber reinforced composite material of the present invention can also be manufactured with a method using the resin composition without using a prepreg.

Examples of such a method include a method in which the resin composition of the present invention containing the constituent elements [B] and [C] is directly impregnated into carbon fibers and then heated and cured, i.e., a hand lay-up method, a filament winding method or a protrusion method, a resin film infusion method in which the resin composition is impregnated into a continuous carbon fiber baser material shaped beforehand into a member form and the result is cured, a resin injection molding method and a resin transfer molding (RTM) method.

The resin composition in the present invention is suitably used in molding methods such as vaccum-assisted resin-transfer molding (VARTM), variable infusion molding process (VIMP), thermal expansion RTM (TERTM), rubber-assisted RTM (RARTM), resin injection recirculation molding (RIRM), continuous RTM (CRTM), co-injection resin transfer molding (CIRTM), resin liquid infusion (RLI) and Seeman's Composite Resin Infusion Molding Process (SCRIMP) listed in a review of RTM methods (SAMPE Journal, vol. 34, no. 6, pp 7 to 19).

DESCRIPTION OF EMBODIMENTS

The present invention is described in detail with embodiments. The scope of the present invention is not limited to the embodiments. Unless specifically noted otherwise, the unit "part" in composition ratios signifies parts by mass. Unless specifically noted otherwise, measurement of the (physical) properties was carried out under an environment in which the temperature was 23° C. and the relative humidity was 50%.

(1) Constituent element [A]
Reinforcing Fibers 1
"Torayca (registered trademark)" T700G-12K-31E (carbon fibers, number of filaments: 12,000, tensile strength: 4.9 GPa, tensile modulus: 230 GPa, tensile elongation: 2.1%, manufactured by Toray Industries, Inc.)
Reinforcing Fibers 2
"Torayca (registered trademark)" T1100G-24K-31E (carbon fibers, number of filaments: 24,000, tensile strength: 6.6 GPa, tensile modulus: 324 GPa, tensile elongation: 2.0%, manufactured by Toray Industries, Inc.)
Reinforcing Fibers 3
A fiber base material comprising carbon fibers produced with the following procedure.

Unidirectional sheet-like reinforcing fiber bundles were formed by disposing carbon fibers "Torayca" (registered trademark) T800G-24K-31E (manufactured by Toray Industries, Inc., PAN carbon fibers, number of filaments: 24,000, fineness: 1,033 tex, tensile modulus: 294 GPa) as the warp fibers at a density of 1.8 fibers/cm and disposing glass fiber bundles ECDE-75-1/0-1.0Z (manufactured by Nitto Boseki Co., Ltd., number of filaments: 800, fineness: 67.5 tex) as auxiliary warp fibers parallel to and alternating with the warp fibers at a density of 1.8 fibers/cm. Glass fiber bundles of E-glass Yarn ECE-225-1/0-1.0Z (Nitto Boseki Co., Ltd., number of filaments: 200, fineness: 22.5 tex) as the weft fibers were arranged at a density of 3 fibers/cm orthogonal to the unidirectional sheet-like carbon fiber groups, the auxiliary warp fibers and the weft fibers were woven with a loom so as to intersect with each other, and a unidirectional non-crimped woven fabric without any crimping and with the carbon fibers substantially unidirectional was produced. The ratio of the fineness of the weft fibers to the carbon fiber fineness of the resulting carbon fiber woven cloth was 2.2%, the fineness ratio of the auxiliary weft fibers was 6.5%, and the basis weight of the carbon fibers was 192 g/m².

Reinforcing Fibers 4

"Torayca (registered trademark)" T800G-24K-10E (carbon fibers, number of filaments: 24,000, tensile strength: 5.9 GPa, tensile modulus: 294 GPa, tensile elongation: 2.0%, manufactured by Toray Industries, Inc.)

Reinforcing Fibers 5

"Torayca (registered trademark)" T300B-12K-50A (carbon fibers, number of filaments: 12,000, tensile strength: 3.5 GPa, tensile modulus: 230 GPa, tensile elongation: 1.5%, manufactured by Toray Industries, Inc.)

Reinforcing Fibers 6

"Torayca (registered trademark)" M46JB-12K-50A (carbon fibers, number of filaments: 12,000, tensile strength: 4.0 GPa, tensile modulus: 436 GPa, tensile elongation: 0.9%, manufactured by Toray Industries, Inc.)

Reinforcing Fibers 7

Carbon fibers with the sizing agent removed using the following procedure. "Torayca (registered trademark)" T800G-24K-10E (carbon fibers, number of filaments: 24,000, tensile strength: 5.9 GPa, tensile modulus: 294 GPa, tensile elongation: 2.0%, manufactured by Toray Industries, Inc.) was immersed in acetone and subjected to three rounds of 30 minutes of ultrasound rinsing. Then the carbon fibers were immersed in methanol, subjected to one round of 30 minutes of ultrasound rinsing, and then dried to obtain carbon fibers 7.

Reinforcing Fibers 8

Carbon fibers with the sizing agent removed using the following procedure. "Torayca (registered trademark)" T1100G-24K-31E (carbon fibers, number of filaments: 24,000, tensile strength: 6.6 GPa, tensile modulus: 324 GPa, tensile elongation: 2.0%, manufactured by Toray Industries, Inc.) was immersed in acetone and subjected to three rounds of 30 minutes of ultrasound rinsing. Then the carbon fibers were immersed in methanol, subjected to one round of 30 minutes of ultrasound rinsing, and then dried to obtain carbon fibers 8.

(2) Constituent Element [B]

An epoxy resin having a structure represented by the general formula (1)

Epoxy Resin 1

N,N'-bis{[4-(9,10-epoxy-7-oxadecyloxy)benzylidene]-biphenylene-4,4'-diamine}, refer to Journal of Polymer Science: Part A: Polymer Chemistry, vol. 42, 3631(2004), epoxy equivalent: 360 g/eq Epoxy Resin 2

4-{4-(2,3-epoxypropoxy)phenyl}cyclohexyl-4-(2,3-epoxypropoxy)benzoate (refer to Japanese Patent No. 5471975) was melted by heating to 200° C., resorcinol (hydroxy group equivalent: 55 g/eq) was added as a prepolymerization agent so that the epoxy equivalent:hydroxy group equivalent was 100:15, and the result was heated for three hours at 200° C. under a nitrogen atmosphere to obtain an epoxy resin 2. The content of the prepolymer was 33 parts by mass to 100 parts by mass of the total of the 4-{4-(2,3-epoxypropoxy)phenyl}cyclohexyl 4-(2,3-epoxypropoxy) benzoate and the prepolymer thereof, and the epoxy equivalent measured according to JIS K7236 was 282 g/eq.

Epoxy Resin 3

Other than changing the epoxy resin to 1-(3-methyl-4-oxiranyl methoxy phenyl)-4-(oxiranyl methoxy phenyl)-1-cyclohexyl (refer to Japanese Patent Application Laid-open No. 2005-206814), an epoxy 3 was obtained in the same manner as the epoxy 2. The content of the prepolymer was 53 parts by mass to 100 parts by mass of the total of the 1-(3-methyl-4-oxiranyl methoxy phenyl)-4-(oxiranyl methoxy phenyl)-1-cyclohexyl and the prepolymer thereof, and the epoxy equivalent measured according to JIS K7236 was 298 g/eq.

Epoxy Resin 4

Compound name: 2-methyl-1,4-phenylene-bis{4-(2,3-epoxypropoxy)benzoate}, refer to Japanese Patent Application Laid-open No. 2010-241797, epoxy equivalent: 245 g/eq)

Epoxy Resin 5

1-(3-methyl-4-oxiranyl methoxy phenyl)-4-(oxiranyl methoxy phenyl)-1-cyclohexyl, refer to Japanese Patent Application Laid-open No. 2005-206814, epoxy equivalent: 202 g/eq)

Epoxy Resin 6

Compound name: 4-{4-(2,3-epoxypropoxy)phenyl}cyclohexyl-4-(2,3-epoxypropoxy)benzoate, refer to Japanese Patent No. 5471975, epoxy equivalent: 213 g/eq)

Epoxy Resin 7

The epoxy resin 6 was melted by heating to 200° C., resorcinol (hydroxy group equivalent: 55 g/eq) was added as a prepolymerization agent so that the epoxy equivalent: hydroxy group equivalent was 100:25, and the result was heated for three hours at 200° C. under a nitrogen atmosphere to obtain the epoxy resin 7. The content of the prepolymer was 53 parts by mass to 100 parts by mass of the total of the epoxy resin 6 and the prepolymer thereof, and the epoxy equivalent measured according to JIS K7236 was 320 g/eq.

Epoxy Resin 8

Other than changing the epoxy resin 67 to the epoxy resin 4, the epoxy 8 was obtained in the same manner as the epoxy 7. The content of the prepolymer was 53 parts by mass to 100 parts by mass of the total of the epoxy resin 4 and the prepolymer thereof, and the epoxy equivalent measured according to JIS K7236 was 353 g/eq.

Epoxy Resin 9

Other than changing the epoxy resin 6 to the epoxy resin 5, the epoxy 9 was obtained in the same manner as the epoxy 7. The content of the prepolymer was 53 parts by mass to 100 parts by mass of the total of the epoxy resin 5 and the prepolymer thereof, and the epoxy equivalent measured according to JIS K7236 was 298 g/eq.

Epoxy Resin 10

Other than changing the added amount of the prepolymerization agent resorcinol so that the epoxy equivalent:hydroxy group equivalent was 100:30, the epoxy resin 10 was obtained in the same manner as the epoxy resin 8. The content of the prepolymer was 63 parts by mass to 100 parts by mass of the total of the epoxy resin 4 and the prepolymer thereof, and the epoxy equivalent measured according to JIS K7236 was 378 g/eq.

Epoxy Resin 11

Other than changing the added amount of the prepolymerization agent resorcinol so that the epoxy equivalent:hydroxy group equivalent was 100:15, the epoxy resin 11 was obtained in the same manner as the epoxy resin 10. The content of the prepolymer was 32 parts by mass to 100 parts by mass of the total of the epoxy resin 4 and the prepolymer thereof, and the epoxy equivalent measured according to JIS K7236 was 311 g/eq.

Epoxy Resin 12

Other than changing the added amount of the prepolymerization agent resorcinol so that the epoxy equivalent:hydroxy group equivalent was 100:30, the epoxy resin 12 was obtained in the same manner as the epoxy resin 7. The content of the prepolymer was 63 parts by mass to 100 parts by mass of the total of the epoxy resin 6 and the prepolymer thereof, and the epoxy equivalent measured according to JIS K7236 was 343 g/eq.

Epoxy Resin 13

Other than changing the prepolymerization agent from resorcinol to bisphenol F (hydroxy group equivalent: 100 g/eq) and the added amount so that the epoxy equivalent:hydroxy group equivalent was 100:15, the epoxy resin 13 was obtained in the same manner as the epoxy resin 8. The content of the prepolymer was 38 parts by mass to 100 parts by mass of the total of the epoxy resin 4 and the prepolymer thereof, and the epoxy equivalent measured according to JIS K7236 was 338 g/eq.

Epoxy Resin 14

Other than changing the prepolymerization agent from resorcinol to bisphenol F (hydroxy group equivalent: 100 g/eq) and the added amount so that the epoxy equivalent:hydroxy group equivalent was 100:15, the epoxy resin 14 was obtained in the same manner as the epoxy resin 7. The content of the prepolymer was 39 parts by mass to 100 parts by mass of the total of the epoxy resin 6 and the prepolymer thereof, and the epoxy equivalent measured according to JIS K7236 was 309 g/eq.

Epoxy resins other than those having a structure represented by the general formula (1)

"EPICLON (registered trademark)" 830 (bisphenol F epoxy resin manufactured by DIC Corporation)

"jER (registered trademark)" YX4000H (bisphenol epoxy resin manufactured by Mitsubishi Chemical Corporation)

"jER (registered trademark)" 604 (tetraglycidyl diaminodiphenylmethane manufactured by Mitsubishi Chemical Corporation)

"Araldite (registered trademark)" MY0610 (triglycidyl-m-aminophenol manufactured by Huntsman Japan KK)

"jER (registered trademark)" 828 (bisphenol A epoxy resin manufactured by Mitsubishi Chemical Corporation).

(3) Constituent Element [C]

"SEIKACURE (registered trademark)"-S (4,4'-diaminodiphenylsulfone manufactured by Wakayama Seika Kogyo Co., Ltd.)

3,3'-DAS(3,3'-diaminodiphenylsulfone manufactured by Mitsui Fine Chemicals, Inc.)

DICY7 (dicyandiamide manufactured by Mitsubishi Chemical Corporation)

DCMU99 {3-(3,4-dichlorophenyl)-1,1-dimethylurea, a curing accelerator manufactured by Hodogaya Chemical Co., Ltd.}

(4) Other Components

"Virantage (registered trademark)" VW-10700RFP (polyethersulfone manufactured by Solvay Advanced Polymers, L.L.C.)

Evaluation Methods (5) Preparation of the Resin Composition

The resin components other than the curing agent and the curing accelerator were placed into a kneader in the prescribed amounts at the mixing ratios shown in Tables 1 to 7, the temperature was raised to 160° C. while kneading, and kneading was carried out for one hour at 160° C. to obtain a transparent viscous liquid. After lowering the temperature to 80° C. while kneading, the curing agent and the curing accelerator were added in the prescribed amounts, and the result was further kneaded to obtain the resin composition.

(6) Production of the Prepreg

The resin composition prepared in (5) was applied onto a release paper with a knife coater to produce a resin film. Then two layers of the resin film were laid over both sides of the reinforcing carbon fibers of the constituent element [A] arranged unidirectionally in a sheet form, the resin was impregnated into the carbon fibers using heating and pressurization, and a unidirectional prepreg was obtained in which the basis weight of the carbon fibers was 190 g/m² and the weight fraction of the resin composition was 35%.

(7) Production of a Composite Material Flat Plate for a Mode I Interlaminar Toughness ($G_{IC}$) Test and $G_{IC}$ Measurement A composite material flat plate for a $G_{IC}$ test was produced using the operations (a) to (e) according to JIS K7086 (1993).

(a) The unidirectional prepreg produced in (6) was laminated to 20 plies with the fibers arranged in the same direction. A fluorine resin film with a width of 40 mm and a thickness of 50 μm was sandwiched in the center laminated surface (between the 10th and 11th plies) at a right angle to the fiber arrangement direction.

(b) The laminated prepreg was covered with a nylon film so as to leave no gaps, and the result was heated and pressurized for curing in an autoclave at an internal pressure of 0.59 MPa for four hours at 150° C. and for two hours at 180° C., molding a unidirectional carbon fiber reinforced composite material.

(c) The unidirectional carbon fiber reinforced composite material obtained in (b) was cut to 20 mm wide and 195 mm long. The cut was made so that the fiber direction was parallel to the long side of the test piece.

(d) The adhesion part peeled off during the test with the pin load block (length: 25 mm, made of aluminum) described in JIS K7086 (1993), so a triangle-like grip was used instead (FIG. 1). A notch 1 mm in length was made in both sides in the width direction at a position 4 mm from the test piece edge (the side sandwiching the fluorine resin film), and the triangle-like grip was set thereat. In the test, the triangle-like grip provided a load onto the test piece by pulling with the crosshead of an Instron Universal Testing Machine (manufactured by Instron).

(e) A white paint was applied to both sides of the test piece to make crack development easier to observe.

The composite material flat plate that was produced was used to make a $G_{IC}$ measurement using the following procedure. The test was carried out according to JIS K7086 (1993) Annex 1 using an Instron Universal Testing Machine (manufactured by Instron). The crosshead speed was set to 0.5 mm/min until crack development reached 20 mm and then 1 ram/min thereafter. The test was carried out until the crack reached 100 mm, and then $G_{IC}$ was computed from the area of the lead-displacement line graph acquired during the test.

(8) Measurement of Mode II Interlaminar Toughness ($G_{IIC}$)

A test piece was produced in the same manner as (a) to (c) for the $G_{IC}$ test of (7) and the resulting test piece had a width of 20 mm and a length of 195 mm. The $G_{IC}$ test was carried out on the test piece according to JIS K7086 (1993) Annex 2.

(9) Production of a Composite Material Flat Plate for a 0° Tensile Strength Test and Measurement The unidirectional prepreg produced in (6) was cut to the prescribed size, laminated unidirectionally to six layers, then a vacuum bag was carried out, heating and pressurization were carried out for curing at an internal pressure of 0.59 MPa with an autoclave for four hours at 150° C. and two hours at 180° C., and a unidirectional carbon fiber reinforced composite material was obtained. The unidirectional carbon fiber reinforced composite material was cut to a width of 12.7 mm and a length of 230 mm, and glass fiber reinforced plastic tabs 1.2 mm and a length of 50 mm were attached to both ends to obtain the test piece. A 0° tensile test was carried out on the test piece using the Instron Universal Testing Machine according to the standards in JIS K7073-1988.

(10) Production of a Prepreg Using a Fiber Base Material

A resin raw material containing the constituent elements [B] and [C] was kneaded in a mixing ratio shown in Tables 1 and 2 to prepare the resin composition. The produced resin composition was applied evenly on the fiber base material of the reinforcing fibers 3 so that the basis weight was 104 g/m². The resin application surface was covered with the FEP film "Toyoflon (registered trademark)" (manufactured by Toray Industries, Inc.) and heated to 150° C., and then the result was compacted with a vacuum pressure of at least 600 mmHg to produce a prepreg with a fiber base material in which the mass ratio of the resin composition was 35%.

(11) Method for Molding a Composite Material Flat Plate using Press Molding for Mode I Interlaminar Toughness ($G_{IC}$) and Mode II Interlaminar Toughness ($G_{IIC}$) Tests and Measurement (a) The prepreg produced in (10) with a fiber base material was laminated to 20 plies with the fibers arranged in the same direction. A fluorine resin film with a width of 40 mm and a thickness of 50 μm was sandwiched in the center laminated surface (between the 10th and 11th plies) at a right angle to the fiber arrangement direction.
(b) The laminated prepreg was placed on a mold and then made to flow and mold for four hours at a temperature of 180° C. under a pressure of 1.0 MPa with a heating press-molding machine, molding a unidirectional carbon fiber reinforced composite material.
(c) The $G_{IC}$ measurement was made in the same manner as (c) to (e) in the $G_{IC}$ test in (7) and the $G_{IIC}$ measurement was made in the same manner as the $G_{IIC}$ test in (8).

(12) Production of a Composite Material Flat Plate using Press Molding for a 0° Tensile Strength Test and Measurement The prepreg produced in (10) using the fiber base material was cut to the prescribed size, laminated unidirectionally to six layers, then a vacuum bag was carried out, heating and pressurization were carried out for curing at an internal pressure of 0.59 MPa with an autoclave for four hours at 150° C. and two hours at 180° C., and a unidirectional carbon fiber reinforced composite material was obtained. The unidirectional carbon fiber reinforced composite material was cut to a width of 12.7 mm and a length of 230 mm, and glass fiber reinforced plastic tabs 1.2 mm and a length of 50 mm were attached to both ends to obtain the test piece. A 0° tensile test was carried out on the test piece using the Instron Universal Testing Machine according to the standards in JIS K7073-1988.

(13) Observations with a Polarized Light Microscope

The unidirectional prepreg produced in (6) or (10) was cut to a width of 50 mm and a length of 50 mm, the fiber interval was manually spread so that the prepreg had a width of at least 80 mm, and then curing was carried out in an oven for four hours at 150° C. and two hours at 180° C. to obtain a test specimen of the carbon fiber reinforced composite material for observation. Observations of the resin region of the test specimen were made with a polarized light microscope (manufactured by Keyence Corporation, VHX-5000 with a polarization filter). When a higher-order structure formation, i.e., a finely shaped structure or a focal conic structure, was observed, an "O" was marked, and when no higher-order structure was observed, an "x" was marked.

(14) Measurement of the Diffraction Angle 2θ using X-Ray Diffraction

After the unidirectional prepreg produced in (6) or (10) was laminated to a thickness of approximately 1 mm, the laminated prepreg was covered with a nylon film so as to leave no gaps, and the result was heated and pressurized for curing in an autoclave at an internal pressure of 0.59 MPa for four hours at 150° C. and for two hours at 180° C., molding a unidirectional carbon fiber reinforced composite material. The molded carbon fiber reinforced composite material was cut to a length of 40 mm and a width of 10 mm to obtain a test piece. Measurements were carried out parallel (0°) to, perpendicular (90°) to and 45° to the carbon fiber axis in the carbon fiber reinforced composite material using the following conditions.

Device: X' PertPro (manufactured by the PANalytical division of Spectris)
X-ray source: CuKa rays (tube voltage: 45 kV, tube current: 40 mA)
Detector: Goniometer+monochromator+scintillation counter
Scanning range: 2θ=1° to 90°
Scanning mode: Step scan, step unit: 0.1°, calculation time: 40 sec The peaks of the diffraction angle 2θ in the range of 1 to 10° are shown in Tables 1 and 2. An "x" was marked when there was no peak.

(15) Measurement of the Molecular Anisotropy in the Resin Cured Product using Polarized Raman Spectroscopy A 2-cm square was cut from the carbon fiber reinforced composite material produced in (7) or (11) to obtain a test piece. Measurements of the resin portion inside the carbon fiber reinforced composite material were made in five random places under the following conditions.

Device: PDP320 (manufactured by PHOTO Design Co., Ltd.)
Beam diameter: 1 μm
Light source: YAG laser/1064 nm
Diffraction grating: Single 300 gr/mm
Slit: 100 μm
Detector: CCD: Jobin Yvon 1024×256
Objective lens: ×100

The polarized Raman spectra were measured with the free direction of the measurement test piece set to 0° and the polarization direction varied from 0° to 150° in 30° intervals. A fluctuation range having, for five measured locations, a polarization azimuth of at least 20% in the Raman band intensity near 1600 cm$^{-1}$ derived from C=C stretching vibration of the aromatic ring was considered to be anisotropic (O), and a fluctuation range of under 20% was considered to be not anisotropic (x).

(16) Measurement of the Liquid Crystal Phase in the Resin Cured Product using Differential Scan Calorimetric Analysis The resin cured product prepared with the method in (5) was heated in an oven to 180° C. at a rate of 1.5° C./min, held at 180° C. for two hours, and then the temperature was lowered to room temperature at 2.5°C./min to obtain the resin cured product. 5 mg of the resulting resin cured product were sampled in a sample pan, a differential scan calorimeter (Q-2000 manufactured by TA Instruments) was used and the temperature was raised from 50° C. to 400° C.

at a rate of 5° C./min under a nitrogen atmosphere. The change in heat flow was recorded and confirmation was made of whether there was an endothermic peak at a temperature of 250° C. or higher.

First and Seventh Embodiments and Comparative Example 2

The resin composition for the carbon fiber reinforced composite material was produced according to the procedure of (5) Preparation of the resin composition following the mixture ratios in Tables 1 and 2. The resulting resin compositions were used to obtain prepregs according to the procedure in (10) Production of a prepreg using a fiber base material. Using the resulting prepregs, (11) Method for molding a composite material flat plate using press molding for mode I interlaminar toughness ($G_{IC}$) and mode II interlaminar toughness ($G_{IIC}$) tests and measurement, (12) Production of a composite material flat plate using press molding for a 0° tensile strength test and measurement, (13) Observations with a polarized light microscope, (14) Measurement of the diffraction angle 2θ using X-ray diffraction and (15) Measurement of the molecular anisotropy in the resin cured product using polarized Raman spectroscopy were conducted. The results are shown in Tables 1 and 2.

Second to Sixth and Eighth Embodiments and Comparative Examples 1 and 3 to 5

The resin composition for the carbon fiber reinforced composite material was produced according to the procedure of (5) Preparation of the resin composition following the mixture ratios in Tables 1 and 2. The resulting resin compositions were used to obtain prepregs according to the procedure in (6) Production of the prepreg. Using the resulting prepregs, (7) Method for molding composite material flat plates using press molding for mode I interlaminar toughness ($G_{IC}$) and mode II interlaminar toughness ($C_{IIC}$) tests and measurement, (8) Measurement of mode II interlaminar toughness ($G_{IIC}$), (9) Production of a composite material flat plate for a 0° tensile strength test and measurement, (13) Observations with a polarized light microscope, (14) Measurement of the diffraction angle 29 using X-ray diffraction and (15) Measurement of the molecular anisotropy in the resin cured product using polarized Raman spectroscopy were conducted. The results are shown in Tables 1 and 2.

The results of the measurements in the embodiments are shown in Tables 1 and 2, and a carbon fiber reinforced composite material with superior mode I interlaminar toughness $G_{IC}$, mode II interlaminar toughness $G_{IIC}$ and tensile strength was obtained by combining carbon fibers and a resin cured product having a higher-order structure as in the first to eighth embodiments.

None of the resin cured products in comparative examples 1 to 5 has a higher-order structure or a resin region in which the molecules have anisotropy. A comparisons of comparative examples 1, 4 and 5 to the eighth embodiment, a comparison of comparative example 2 to the first and seventh embodiments, and a comparison of comparative example 3 to the second to seventh embodiments show that the mode I interlaminar toughness $G_{IC}$, the mode II interlaminar toughness $G_{IIC}$ and the tensile strength are all lower than in the embodiments using the same constituent element [A], and in particular the mode I interlaminar toughness $G_{IC}$ and the mode II interlaminar toughness $G_{IIC}$ are dramatically improved by the present invention. As a result of measuring the liquid crystal phase in the resin cured product with differential scan calorimetric analysis of the resin cured product in the second embodiment with the method in (16), endothermic peaks were observed at 335° C. and 358° C., and the formation of a liquid crystal phase was confirmed. As a result of measuring, in the same manner, the liquid crystal phase in the resin cured product using differential scan calorimetric analysis of the resin cured product of comparative example 1, no endothermic peaks were observed at a temperature of 250° C. or higher and no liquid crystal phase was formed.

Ninth to 11th and 34th Embodiments and Comparative Example 7

The resin compositions for the carbon fiber reinforced composite material were produced according to the procedure of (5) Preparation of the resin composition following the mixture ratios in Tables 3 and 6.

Prepregs were produced following (10) Production of a prepreg using a fiber base material. Using the obtained prepregs, the $G_{IC}$, $G_{IIC}$ and the tensile strength were measured according to the procedures in (11) Method for molding a composite material flat plate using press molding for mode I interlaminar toughness ($G_{IC}$) and mode II interlaminar toughness ($G_{IIC}$) tests and measurement, and (12) Production of a composite material flat plate using press molding for a 0° tensile strength test and measurement. The results are shown in Tables 3 and 6.

12th to 33rd Embodiments and Comparative Examples 6 and 8 to 10

The resin compositions for the carbon fiber reinforced composite material were produced according to the procedure of (5) Preparation of the resin composition following the mixture ratios in Tables 3 to 6.

Each of the obtained resin compositions was used to obtain a prepreg according to the procedure in (6) Production of the prepreg. Using the obtained prepregs, (7) Production of a composite material flat plate for a mode I interlaminar toughness ($G_{IC}$) test and $G_{IC}$ measurement, (8) Measurement of mode II interlaminar toughness ($G_{IIC}$), (9) Production of a composite material flat plate for a 0° tensile strength test and measurement, and the measurement of the $G_{IC}$, the $G_{IIC}$ and the tensile strength were carried out. The results are shown in Tables 3 to 6.

The results of the measurements in the embodiments are shown in Tables 3 to 6, and when the carbon fiber reinforced composite material in which the resin cured product has a higher-order structure derived from a diffraction angle 2θ between 1.0° and 6.0° observed with X-ray diffraction or the resin cured product is heated from 50° C. to 400° C. at a rate of 5° C./min in differential scan calorimetric analysis under a nitrogen atmosphere, the carbon fiber reinforced composite material having an endothermic peak at a temperature of 250° or higher has a high resin toughness and indicates excellent mode I interlaminar toughness $G_{IC}$, mode II interlaminar toughness $G_{IIC}$ and tensile strength even if there is fluctuation in the material and mixture ratio of the resin composition containing the constituent element [A], the constituent element [B] and the constituent element [C] as in the ninth to 34th embodiments.

In comparative examples 1 to 5, an epoxy resin having a structure represented by the general formula (1) is not used, the resin cured product does not have a higher-order structure derived from a diffraction angle 2θ between 1.0° and 6.0° observed with X-ray diffraction, and the resin cured product does not have an endothermic peak at a temperature of 250° C. or higher when heated from 50° C. to 400° C. at a rate of 5° C./min in differential scan calorimetric analysis under a nitrogen atmosphere. A comparison of comparative examples 1, 4 and 5 to the fourth to 23rd embodiments, a comparison of comparative example 2 to the first to third and 26th embodiments, and a comparison of comparative example 3 to the 25th embodiment show that the mode I interlaminar toughness $G_{IC}$, the mode II interlaminar toughness $G_{IIC}$ and the tensile strength are all lower than in the embodiments using the same constituent element [A], and in particular the mode I interlaminar toughness $G_{IC}$ is dramatically improved by the epoxy resin having a structure represented by the general formula (1).

35th to 38th Embodiments and Comparative Examples 11 to 14

Resin compositions for the carbon fiber reinforced composite material were produced with the procedure of (5) Preparation of the resin composition following the mixture ratios in Table 7. The resulting resin compositions were used to obtain prepregs with the procedure in (6) Production of the prepreg. Using the resulting prepregs, (7) Method for molding composite material flat plates using press molding for mode I interlaminar toughness ($G_{IC}$) and mode II interlaminar toughness ($G_{IIC}$) tests and measurement, (8) Measurement of mode II interlaminar toughness ($G_{IIC}$), (9) Production of a composite material flat plate for a 0° tensile strength test and measurement, (13) Observations with a polarized light microscope, (14) Measurement of the diffraction angle 2θ using X-ray diffraction and (15) Measurement of the molecular anisotropy in the resin cured product using polarized Raman spectroscopy were carried out. The results are shown in Table 7.

The results of the measurements in the embodiments are shown in Table 7, and superior mode I interlaminar toughness $G_{IC}$, mode II interlaminar toughness $G_{IIC}$ and tensile strength were obtained by combining carbon fibers and a resin cured product having a higher-order structure as in the 35th to 38th embodiments.

None of the resin cured products in comparative examples 11 to 14 has a higher-order structure or a resin region in which the molecules have anisotropy.

In comparisons of the 35th embodiment and comparative example 11, the 36th embodiment and comparative example 12, the 37th embodiment and comparative example 13, and the 38th embodiment and comparative example 14 using identical carbon fibers, it is seen that the mode I interlaminar toughness $G_{IC}$, the mode II interlaminar toughness $G_{IIC}$ and the tensile strength are all dramatically improved by the present invention.

TABLE 1

| | | Embodiment 1 | Embodiment 2 | Embodiment 3 | Embodiment 4 | Embodiment 5 | Embodiment 6 |
|---|---|---|---|---|---|---|---|
| Constituent elements [A] | Reinforcing fibers 1 | | | | | | |
| | Reinforcing fibers 2 | | • | • | • | • | • |
| | Reinforcing fibers 3 | • | | | | | |
| Constituent elements [B] | Epoxy resin 1 | 100 | | | | | |
| Epoxy resins having a | Epoxy resin 2 | | 100 | | 70 | 95 | 95 |
| structure represented by | Epoxy resin 3 | | | 100 | | | |
| general formula (1) | Epoxy resin 4 | | | | | | |
| Constituent elements [B] | "EPICLON" 830 | | | | 30 | | |
| Epoxy resins not having a | "jER" YX4000 | | | | | | |
| structure represented by | "jER" 604 | | | | | 5 | |
| general formula (1) | MY0610 | | | | | | 5 |
| | "jER" 828 | | | | | | |
| Constituent elements [C] | "SEIKACURE"-S | | 20 | | 26 | | |
| | 3,3'-DDS | 17 | | | | 24 | 24 |
| | DICY | | | 6 | | | |
| | DCMU | | | 3 | | | |
| Other resin components | "Virantage" VW-10700RFP | | | | | | 4 |
| Fiber reinforced composite material properties | Diffraction angle 2θ using X-ray diffraction | 2.2 | 3.4 | 3.8 | 3.2 | 3.4 | 3.4 |
| | Observation result using a polarized light microscope | ○ | ○ | ○ | ○ | ○ | ○ |
| | Molecular anisotropy in the matrix resin using polarized Raman spectroscopy | ○ | ○ | ○ | x | ○ | ○ |
| | $G_{IC}$ (in-lb/in$^2$) | 6.8 | 6.2 | 5.1 | 5.2 | 5.8 | 6.0 |
| | $G_{IIC}$ (in-lb/in$^2$) | 6.3 | 5.9 | 5.0 | 5.0 | 5.5 | 5.7 |
| | Tensile strength (ksi) | 430 | 490 | 485 | 483 | 495 | 503 |

TABLE 2

| | | Embodiment 7 | Embodiment 8 | Comparative example 1 | Comparative example 2 |
|---|---|---|---|---|---|
| Constituent elements [A] | Reinforcing fibers 1 | | | • | |
| | Reinforcing fibers 2 | | | | |
| | Reinforcing fibers 3 | • | | | • |
| Constituent elements [B] | Epoxy resin 1 | | | | |
| Epoxy resins having a | Epoxy resin 2 | | | | |
| structure represented | Epoxy resin 3 | | 100 | | |
| by general formula (1) | Epoxy resin 4 | 100 | | | |

TABLE 2-continued

| | | | | | |
|---|---|---|---|---|---|
| Constituent elements [B] Epoxy resins not having a structure represented by general formula (1) | "EPICLON" 830 "jER" YX4000 "jER" 604 MY0610 "jER" 828 | | | 100 | 100 |
| Constituent elements [C] | "SEIKACURE"-S 3,3'-DDS DICY DCMU | 25 | 22 | 50 | 50 |
| Other resin components | "Virantage" VW-10700RFP | | | 10 | 10 |
| Fiber reinforced composite material properties | Diffraction angle 2θ using X-ray diffraction | 3.6 | 3.6 | x | x |
| | Observation result using a polarized light microscope | ○ | ○ | x | x |
| | Molecular anisotropy in the matrix resin using polarized Raman spectroscopy | ○ | ○ | x | x |
| | GIC (in-lb/in$^2$) | 7.2 | 5.6 | 1.7 | 2 |
| | GIIC (in-lb/in$^2$) | 5.9 | 5.3 | 2.1 | 1.8 |
| | Tensile strength (ksi) | 428 | 380 | 335 | 377 |

| | | Comparative example 3 | Comparative example 4 | Comparative example 5 |
|---|---|---|---|---|
| Constituent elements [A] | Reinforcing fibers 1 | | • | • |
| | Reinforcing fibers 2 | • | | |
| | Reinforcing fibers 3 | | | |
| Constituent elements [B] Epoxy resins having a structure represented by general formula (1) | Epoxy resin 1 Epoxy resin 2 Epoxy resin 3 Epoxy resin 4 | | | |
| Constituent elements [B] Epoxy resins not having a structure represented by general formula (1) | "EPICLON" 830 "jER" YX4000 "jER" 604 MY0610 "jER" 828 | 100 | 50 50 | 50 50 |
| Constituent elements [C] | "SEIKACURE"-S 3,3'-DDS DICY DCMU | 50 | 40 | 40 |
| Other resin components | "Virantage" VW-10700RFP | 10 | 30 | 5 |
| Fiber reinforced composite material properties | Diffraction angle 2θ using X-ray diffraction | x | x | x |
| | Observation result using a polarized light microscope | x | x | x |
| | Molecular anisotropy in the matrix resin using polarized Raman spectroscopy | x | x | x |
| | GIC (in-lb/in$^2$) | 1.8 | 3.5 | 2.7 |
| | GIIC (in-lb/in$^2$) | 2.1 | 3.2 | 2.5 |
| | Tensile strength (ksi) | 450 | 361 | 352 |

TABLE 3

| | | Embodiment 9 | Embodiment 10 | Embodiment 11 | Embodiment 12 | Embodiment 13 |
|---|---|---|---|---|---|---|
| Constituent elements [A] | Reinforcing fibers 1 | | | | • | • |
| | Reinforcing fibers 2 | | | | | |
| | Reinforcing fibers 3 | • | • | • | | |
| | Reinforcing fibers 4 | | | | | |
| Constituent elements [B] Epoxy resins having a structure represented by general formula (1) | Epoxy resin 2 | | | | | |
| | Epoxy resin 4 | | 100 | | | |
| | Epoxy resin 5 | 100 | | | | |
| | Epoxy resin 6 | | | 100 | | |
| | Epoxy resin 7 | | | | 100 | |
| | Epoxy resin 8 | | | | | 100 |
| | Epoxy resin 9 | | | | | |
| | Epoxy resin 10 | | | | | |
| | Epoxy resin 11 | | | | | |
| | Epoxy resin 12 | | | | | |
| | Epoxy resin 13 | | | | | |
| | Epoxy resin 14 | | | | | |
| Constituent elements [B] Epoxy resins not having a structure represented by | "EPICLON" 830 "jER" YX4000H "EPICLON" HP7200H | | | | | |

TABLE 3-continued

| | | | | | | |
|---|---|---|---|---|---|---|
| general formula (1) | "jER" 604 | | | | | |
| | "jER" 828 | | | | | |
| Constituent elements [C] | "SEIKACURE"-S | 28 | 23 | 26 | | |
| | 3,3'-DDS | | | | 18 | 16 |
| | DICY | | | | | |
| | DCMU | | | | | |
| Other resin components | "Virantage" VW-10700RFP | | | | | |
| Fiber reinforced | $G_{IC}$ (in-lb/in$^2$) | 7.2 | 6.3 | 6.6 | 8.5 | 8.6 |
| composite material | $G_{IIC}$ (in-lb/in$^2$) | 6.3 | 6.4 | 5.8 | 7.5 | 7.2 |
| properties | Tensile strength (ksi) | 438 | 443 | 445 | 400 | 390 |

| | | | Embodiment 14 | Embodiment 15 | Embodiment 16 |
|---|---|---|---|---|---|
| Constituent elements [A] | | Reinforcing fibers 1 | • | • | • |
| | | Reinforcing fibers 2 | | | |
| | | Reinforcing fibers 3 | | | |
| | | Reinforcing fibers 4 | | | |
| Constituent elements [B] | | Epoxy resin 2 | | | |
| Epoxy resins having a | | Epoxy resin 4 | | | |
| structure represented by | | Epoxy resin 5 | | | |
| general formula (1) | | Epoxy resin 6 | | | |
| | | Epoxy resin 7 | | | |
| | | Epoxy resin 8 | | | |
| | | Epoxy resin 9 | 100 | | |
| | | Epoxy resin 10 | | 100 | |
| | | Epoxy resin 11 | | | 100 |
| | | Epoxy resin 12 | | | |
| | | Epoxy resin 13 | | | |
| | | Epoxy resin 14 | | | |
| Constituent elements [B] | | "EPICLON" 830 | | | |
| Epoxy resins not having a | | "jER" YX4000H | | | |
| structure represented by | | "EPICLON" HP7200H | | | |
| general formula (1) | | "jER" 604 | | | |
| | | "jER" 828 | | | |
| Constituent elements [C] | | "SEIKACURE"-S | | | |
| | | 3,3'-DDS | 19 | 15 | 18 |
| | | DICY | | | |
| | | DCMU | | | |
| Other resin components | | "Virantage" VW-10700RFP | | | |
| Fiber reinforced | | $G_{IC}$ (in-lb/in$^2$) | 8.2 | 5.5 | 6.4 |
| composite material | | $G_{IIC}$ (in-lb/in$^2$) | 7.0 | 5.1 | 5.4 |
| properties | | Tensile strength (ksi) | 390 | 368 | 364 |

TABLE 4

| | | Embodiment 17 | Embodiment 18 | Embodiment 19 | Embodiment 20 | Embodiment 21 |
|---|---|---|---|---|---|---|
| Constituent elements [A] | Reinforcing fibers 1 | • | • | • | • | • |
| | Reinforcing fibers 2 | | | | | |
| | Reinforcing fibers 3 | | | | | |
| | Reinforcing fibers 4 | | | | | |
| Constituent elements [B] | Epoxy resin 2 | | | 100 | | |
| Epoxy resins having a | Epoxy resin 4 | | | | | |
| structure represented by | Epoxy resin 5 | | | | | |
| general formula (1) | Epoxy resin 6 | | | | | |
| | Epoxy resin 7 | | | | | |
| | Epoxy resin 8 | | | | | |
| | Epoxy resin 9 | | | | | |
| | Epoxy resin 10 | | | | | |
| | Epoxy resin 11 | | | | | 100 |
| | Epoxy resin 12 | | 100 | | | |
| | Epoxy resin 13 | | | | 100 | |
| | Epoxy resin 14 | | | | 100 | |
| Constituent elements [B] | "EPICLON" 830 | | | | | |
| Epoxy resins not having a | "jER" YX4000H | | | | | |
| structure represented by | "EPICLON" HP7200H | | | | | |
| general formula (1) | "jER" 604 | | | | | |
| | "jER" 828 | | | | | |
| Constituent elements [C] | "SEIKACURE"-S | | | | | |
| | 3,3'-DDS | 17 | 20 | 17 | 18 | |
| | DICY | | | | | 18 |
| | DCMU | | | | | |
| Other resin components | "Virantage" VW-10700RFP | | | | | |
| Fiber reinforced | $G_{IC}$ (in-lb/in$^2$) | 6.5 | 7 | 6.7 | 7.1 | 5.1 |

TABLE 4-continued

| composite material properties | $G_{IIC}$ (in-lb/in²) | 5.7 | 6.2 | 6.0 | 6.7 | 5.4 |
|---|---|---|---|---|---|---|
| | Tensile strength (ksi) | 370 | 380 | 395 | 388 | 363 |

| | | Embodiment 22 | Embodiment 23 | Embodiment 24 |
|---|---|---|---|---|
| Constituent elements [A] | Reinforcing fibers 1 | • | • | • |
| | Reinforcing fibers 2 | | | |
| | Reinforcing fibers 3 | | | |
| | Reinforcing fibers 4 | | | |
| Constituent elements [B] Epoxy resins having a structure represented by general formula (1) | Epoxy resin 2 | | 100 | 100 |
| | Epoxy resin 4 | | | |
| | Epoxy resin 5 | | | |
| | Epoxy resin 6 | | | |
| | Epoxy resin 7 | | | |
| | Epoxy resin 8 | 100 | | |
| | Epoxy resin 9 | | | |
| | Epoxy resin 10 | | | |
| | Epoxy resin 11 | | | |
| | Epoxy resin 12 | | | |
| | Epoxy resin 13 | | | |
| | Epoxy resin 14 | | | |
| Constituent elements [B] Epoxy resins not having a structure represented by general formula (1) | "EPICLON" 830 | | | |
| | "jER" YX4000H | | | |
| | "EPICLON" HP7200H | | | |
| | "jER" 604 | | | |
| | "jER" 828 | | | |
| Constituent elements [C] | "SEIKACURE"-S | | | |
| | 3,3'-DDS | | 15 | 27 |
| | DICY | 16 | | |
| | DCMU | | | |
| Other resin components | "Virantage" VW-10700RFP | | | |
| Fiber reinforced composite material properties | $G_{IC}$ (in-lb/in²) | 5.5 | 7.2 | 7 |
| | $G_{IIC}$ (in-lb/in²) | 6.0 | 6.8 | 6.5 |
| | Tensile strength (ksi) | 365 | 382 | 380 |

TABLE 5

| | | Embodiment 25 | Embodiment 26 | Embodiment 27 | Embodiment 28 |
|---|---|---|---|---|---|
| Constituent elements [A] | Reinforcing fibers 1 | • | • | • | • |
| | Reinforcing fibers 2 | | | | |
| | Reinforcing fibers 3 | | | | |
| | Reinforcing fibers 4 | | | | |
| Constituent elements [B] Epoxy resins having a structure represented by general formula (1) | Epoxy resin 2 | 100 | | | |
| | Epoxy resin 4 | | | | |
| | Epoxy resin 5 | | | | |
| | Epoxy resin 6 | | | | |
| | Epoxy resin 7 | | | | |
| | Epoxy resin 8 | | | | 70 |
| | Epoxy resin 9 | | | | |
| | Epoxy resin 10 | | | | |
| | Epoxy resin 11 | | 100 | 100 | |
| | Epoxy resin 12 | | | | |
| | Epoxy resin 13 | | | | |
| | Epoxy resin 14 | | | | |
| Constituent elements [B] Epoxy resins not having a structure represented by general formula (1) | "EPICLON" 830 | | | | 30 |
| | "jER" YX4000H | | | | |
| | "EPICLON" HP7200H | | | | |
| | "jER" 604 | | | | |
| | "jER" 828 | | | | |
| Constituent elements [C] | "SEIKACURE"-S | | 5 | | |
| | 3,3'-DDS | 31 | | | 25 |
| | DICY | | 5 | 6 | |
| | DCMU | | 2.5 | 3 | |
| Other resin components | "Virantage" VW-10700RFP | | | | |
| Fiber reinforced composite material properties | $G_{IC}$ (in-lb/in²) | 7.5 | 5.9 | 5.8 | 5.2 |
| | $G_{IIC}$ (in-lb/in²) | 7 | 5.5 | 5.6 | 5.0 |
| | Tensile strength (ksi) | 390 | 368 | 363 | 361 |

TABLE 5-continued

| | | Embodiment 29 | Embodiment 30 | Embodiment 31 |
|---|---|---|---|---|
| Constituent elements [A] | Reinforcing fibers 1 | • | • | • |
| | Reinforcing fibers 2 | | | |
| | Reinforcing fibers 3 | | | |
| | Reinforcing fibers 4 | | | |
| Constituent elements [B] Epoxy resins having a structure represented by general formula (1) | Epoxy resin 2 | | | |
| | Epoxy resin 4 | | | |
| | Epoxy resin 5 | | | |
| | Epoxy resin 6 | | | |
| | Epoxy resin 7 | | | |
| | Epoxy resin 8 | 50 | 95 | 90 |
| | Epoxy resin 9 | | | |
| | Epoxy resin 10 | | | |
| | Epoxy resin 11 | | | |
| | Epoxy resin 12 | | | |
| | Epoxy resin 13 | | | |
| | Epoxy resin 14 | | | |
| Constituent elements [B] Epoxy resins not having a structure represented by general formula (1) | "EPICLON" 830 | | | |
| | "jER" YX4000H | 50 | | |
| | "EPICLON" HP7200H | | 5 | |
| | "jER" 604 | | | 10 |
| | "jER" 828 | | | |
| Constituent elements [C] | "SEIKACURE"-S | | | |
| | 3,3'-DDS | 25 | 18 | 20 |
| | DICY | | | |
| | DCMU | | | |
| Other resin components | "Virantage" VW-10700RFP | 4 | | 4 |
| Fiber reinforced composite material properties | $G_{IC}$ (in-lb/in$^2$) | 5.1 | 6.3 | 6.3 |
| | $G_{IIC}$ (in-lb/in$^2$) | 5.3 | 5.9 | 5.8 |
| | Tensile strength (ksi) | 362 | 366 | 365 |

TABLE 6

| | | Embodiment 32 | Embodiment 33 | Embodiment 34 | Comparative example 6 | Comparative example 7 |
|---|---|---|---|---|---|---|
| Constituent elements [A] | Reinforcing fibers 1 | | | | • | |
| | Reinforcing fibers 2 | | • | | | • |
| | Reinforcing fibers 3 | | | • | | |
| | Reinforcing fibers 4 | • | | | | |
| Constituent elements [B] Epoxy resins having a structure represented by general formula (1) | Epoxy resin 2 | | 100 | | | |
| | Epoxy resin 4 | | | | | |
| | Epoxy resin 5 | | | 100 | | |
| | Epoxy resin 6 | | | | | |
| | Epoxy resin 7 | | | | | |
| | Epoxy resin 8 | | | | | |
| | Epoxy resin 9 | | | | | |
| | Epoxy resin 10 | | | | | |
| | Epoxy resin 11 | 100 | | | | |
| | Epoxy resin 12 | | | | | |
| | Epoxy resin 13 | | | | | |
| | Epoxy resin 14 | | | | | |
| Constituent elements [B] Epoxy resins not having a structure represented by general formula (1) | "EPICLON" 830 | | | | | |
| | "jER" YX4000H | | | | | |
| | "EPICLON" HP7200H | | | | | |
| | "jER" 604 | | | | 100 | 100 |
| | "jER" 828 | | | | | |
| Constituent elements [C] | "SEIKACURE"-S | | | | | 50 |
| | 3,3'-DDS | 18 | 20 | 23 | 50 | |
| | DICY | | | | | |
| | DCMU | | | | | |
| Other resin components | "Virantage" VW-10700RFP | | | | 10 | 10 |
| Fiber reinforced composite material properties | $G_{IC}$ (in-lb/in$^2$) | 6.4 | 6.5 | 7.5 | 1.7 | 2 |
| | $G_{IIC}$ (in-lb/in$^2$) | 5.5 | 5.4 | 6.7 | 2.1 | 1.8 |
| | Tensile strength (ksi) | 470 | 510 | 480 | 335 | 377 |

| | | Comparative example 8 | Comparative example 9 | Comparative example 10 |
|---|---|---|---|---|
| Constituent elements [A] | Reinforcing fibers 1 | | • | • |
| | Reinforcing fibers 2 | • | | |
| | Reinforcing fibers 3 | | | |
| | Reinforcing fibers 4 | | | |

TABLE 6-continued

| | | | | |
|---|---|---|---|---|
| Constituent elements [B] Epoxy resins having a structure represented by general formula (1) | Epoxy resin 2 | | | |
| | Epoxy resin 4 | | | |
| | Epoxy resin 5 | | | |
| | Epoxy resin 6 | | | |
| | Epoxy resin 7 | | | |
| | Epoxy resin 8 | | | |
| | Epoxy resin 9 | | | |
| | Epoxy resin 10 | | | |
| | Epoxy resin 11 | | | |
| | Epoxy resin 12 | | | |
| | Epoxy resin 13 | | | |
| | Epoxy resin 14 | | | |
| Constituent elements [B] Epoxy resins not having a structure represented by general formula (1) | "EPICLON" 830 | | | |
| | "jER" YX4000H | | | 50 |
| | "EPICLON" HP7200H | | | |
| | "jER" 604 | 100 | 50 | 50 |
| | "jER" 828 | | 50 | |
| Constituent elements [C] | "SEIKACURE"-S | | 40 | 40 |
| | 3,3'-DDS | 50 | | |
| | DICY | | | |
| | DCMU | | | |
| Other resin components | "Virantage" VW-10700RFP | 10 | 30 | 5 |
| Fiber reinforced composite material properties | $G_{IC}$ (in-lb/in$^2$) | 1.8 | 3.5 | 2.7 |
| | $G_{IIC}$ (in-lb/in$^2$) | 2.1 | 3.2 | 2.5 |
| | Tensile strength (ksi) | 450 | 361 | 352 |

TABLE 7

| | | Embodiment 35 | Embodiment 36 | Embodiment 37 | Embodiment 38 | Comparative example 11 |
|---|---|---|---|---|---|---|
| Constituent elements [A] | Reinforcing fibers 1 | | | | | |
| | Reinforcing fibers 2 | | | | | |
| | Reinforcing fibers 3 | | | | | |
| | Reinforcing fibers 4 | | | | | |
| | Reinforcing fibers 5 | • | | | | • |
| | Reinforcing fibers 6 | | • | | | |
| | Reinforcing fibers 7 | | | • | | |
| | Reinforcing fibers 8 | | | | • | |
| Constituent elements [B] Epoxy resins having a structure represented by general formula (1) | Epoxy resin 1 | | | | | |
| | Epoxy resin 2 | | | | 95 | |
| | Epoxy resin 3 | | | | | |
| | Epoxy resin 4 | 100 | 100 | 100 | | |
| Constituent elements [B] Epoxy resins not having a structure represented by general formula (1) | "EPICLON" 830 | | | | | |
| | "jER" YX4000 | | | | | |
| | "jER" 604 | | | | 5 | 50 |
| | MY0610 | | | | | |
| | "jER" 828 | | | | | 50 |
| Constituent elements [C] | "SEIKACURE"-S | | | | | 40 |
| | 3,3'-DDS | 25 | 25 | 25 | 24 | |
| | DICY | | | | | |
| | DCMU | | | | | |
| Other resin components | "Virantage" VW-10700RFP | | | | | 30 |
| Fiber reinforced composite material properties | Diffraction angle 2θ using X-ray diffraction | 3.6 | 3.6 | 3.6 | 3.4 | x |
| | Observation result using a polarized light microscope | ○ | ○ | ○ | ○ | x |
| | Molecular anisotropy in the matrix resin using polarized Raman spectroscopy | ○ | ○ | ○ | ○ | x |
| | $G_{IC}$ (in-lb/in$^2$) | 5.3 | 3.0 | 5.2 | 4.8 | 1.5 |
| | $G_{IIC}$ (in-lb/in$^2$) | 5.3 | 4.8 | 4.3 | 4.3 | 3.6 |
| | Tensile strength (ksi) | 260 | 300 | 410 | 480 | 230 |

| | | Comparative example 12 | Comparative example 13 | Comparative example 14 |
|---|---|---|---|---|
| Constituent elements [A] | Reinforcing fibers 1 | | | |
| | Reinforcing fibers 2 | | | |
| | Reinforcing fibers 3 | | | |
| | Reinforcing fibers 4 | | | |
| | Reinforcing fibers 5 | | | |
| | Reinforcing fibers 6 | • | | |
| | Reinforcing fibers 7 | | • | |
| | Reinforcing fibers 8 | | | • |
| Constituent elements [B] Epoxy resins having a | Epoxy resin 1 | | | |
| | Epoxy resin 2 | | | |

TABLE 7-continued

|  |  |  |  |  |
|---|---|---|---|---|
| structure represented by general formula (1) | Epoxy resin 3 Epoxy resin 4 |  |  |  |
| Constituent elements [B] Epoxy resins not having a structure represented by general formula (1) | "EPICLON" 830 "jER" YX4000 "jER" 604 MY0610 "jER" 828 | 50 50 | 100 | 100 |
| Constituent elements [C] | "SEIKACURE"-S 3,3'-DDS DICY DCMU | 40 | 50 | 50 |
| Other resin components | "Virantage" VW-10700RFP | 30 | 10 | 10 |
| Fiber reinforced composite material properties | Diffraction angle 2θ using X-ray diffraction | x | x | x |
|  | Observation result using a polarized light microscope | x | x | x |
|  | Molecular anisotropy in the matrix resin using polarized Raman spectroscopy | x | x | x |
|  | $G_{IC}$ (in-lb/in$^2$) | 0.8 | 2.2 | 2.2 |
|  | $G_{IIC}$ (in-lb/in$^2$) | 3.6 | 1.7 | 2.0 |
|  | Tensile strength (ksi) | 270 | 390 | 451 |

The invention claimed is:

1. A prepreg comprising the following constituent elements [A] to [C], wherein a resin composition containing the constituent elements [B] and [C] has a higher-order structure derived from a diffraction angle 2θ between 1.0° and 6.0° observed with X-ray diffraction after curing:

[A]: carbon fibers
[B]: epoxy resin
[C]: curing agent of [B];

wherein the constituent element [B] contains an epoxy resin having a structure represented by general formula (1) below:

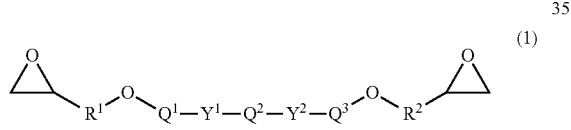
(1)

wherein, in the general formula (1), $Q^1$, $Q^2$ and $Q^3$ each contains one structure selected from a group (I), $R^1$ and $R^2$ in the general formula (1) each represents an alkylene group having a carbon number of 1 to 6, each Z in the group (I) independently represents an aliphatic hydrocarbon group having a carbon number of 1 to 8, an aliphatic alkoxy group having a carbon number of 1 to 8, a fluorine atom, a chlorine atom, a bromine atom, an iodine atom, a cyano group, a nitro group, or an acetyl group, each n independently represents an integer of 0 to 4, and $Y^1$, $Y^2$ and $Y^3$ in the general formula (1) and the group (I) each represents at least one divalent group selected from a group (II) or a linking group comprising a single bond:

GROUP (I)

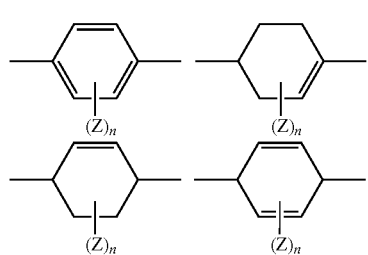

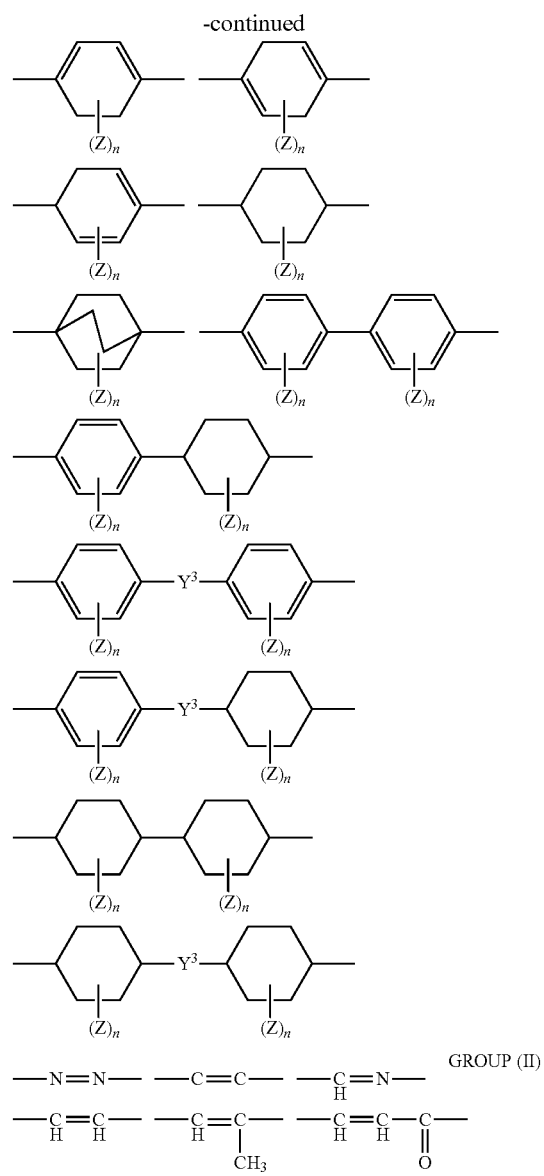

GROUP (II)

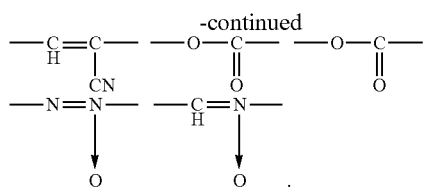

wherein the constituent element [B] further contains an epoxy resin prepolymer of the epoxy resin having the structure represented by general formula (1).

2. The prepreg according to claim 1, wherein a resin cured product obtained by curing the resin composition containing the constituent elements [B] and [C] has an endothermic peak at 250° C. or higher when heated from 50° C. to 400° C. at a rate of 5° C/min in differential scan calorimetric analysis under a nitrogen atmosphere.

3. The prepreg according to claim 1, wherein the resin composition containing the constituent elements [B] and [C] contains a resin region indicating molecular anisotropy after curing.

4. The prepreg according to claim 1, wherein a ratio of the epoxy resin having a structure represented by the general formula (1) and the epoxy resin prepolymer to 100 parts by mass of all the epoxy resin in the constituent element [B] is 90 to 100 parts by mass.

5. The prepreg according to claim 1, wherein a molecular weight of the prepolymer is 250 to 3500.

6. The prepreg according to claim 1, wherein the prepolymer is a polymer of an epoxy resin having a structure represented by the general formula (1) or a reactant of an epoxy resin having a structure represented by the general formula (1) and a prepolymerization agent.

7. The prepreg according to claim 6, wherein the prepolymerization agent is at least one selected from a group consisting of a phenol compound, an amine compound, an amide compound, a sulfide compound and an acid anhydride.

8. The prepreg according to claim 6, wherein the prepolymerization agent is a phenol compound having two to four hydroxy groups in each molecule.

9. The prepreg according to claim 1, wherein a content of the epoxy resin prepolymer is in a range of 5 to 80 parts by mass to 100 parts by mass of the total of the epoxy resin and the epoxy resin prepolymer in the constituent element [B].

10. The prepreg according to claim 1, wherein the constituent element [C] is 3,3'-diaminodiphenylsulfone.

11. The prepreg according to claim 1, wherein the group (I) in the general formula (1) is the following group:

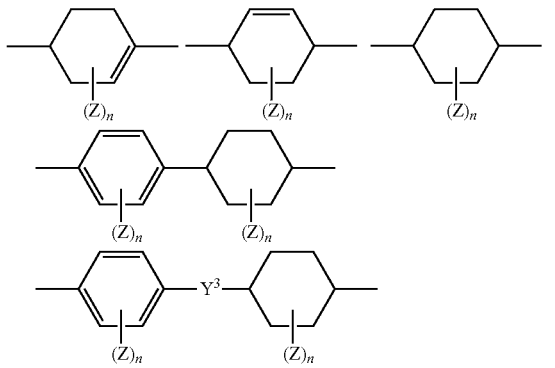

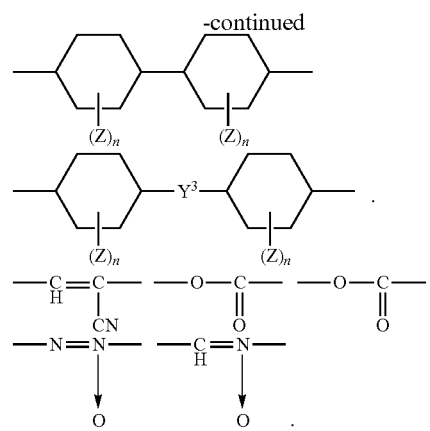

12. A carbon fiber reinforced composite material formed by curing the prepreg according to claim 1.

13. A carbon fiber reinforced composite material comprising the following constituent element [A] and a resin cured product formed by curing a resin composition containing the following constituent elements [B] and [C], the resin cured product having a higher-order structure derived from a diffraction angle 2θ between 1.0° and 6.0° observed with X-ray diffraction:
[A]: carbon fibers
[B]: epoxy resin
[C]: curing agent of [B];
wherein the constituent element [B] contains an epoxy resin having a structure represented by general formula (1) below:

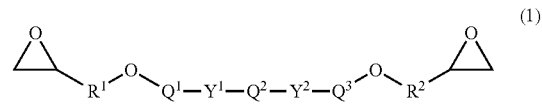

wherein, in the general formula (1), $Q^1$, $Q^2$ and $Q^3$ each contains one structure selected from a group (I), $R^1$ and $R^2$ in the general formula (1) each represents an alkylene group having a carbon number of 1 to 6, each Z in the group (I) independently represents an aliphatic hydrocarbon group having a carbon number of 1 to 8, an aliphatic alkoxy group having a carbon number of 1 to 8, a fluorine atom, a chlorine atom, a bromine atom, an iodine atom, a cyano group, a nitro group, or an acetyl group, each n independently represents an integer of 0 to 4, and $Y^1$, $Y^2$ and $Y^3$ in the general formula (1) and the group (I) each represents at least one divalent group selected from a group (II) or a linking group comprising a single bond:

GROUP (I)

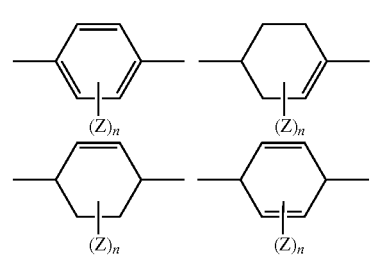

-continued

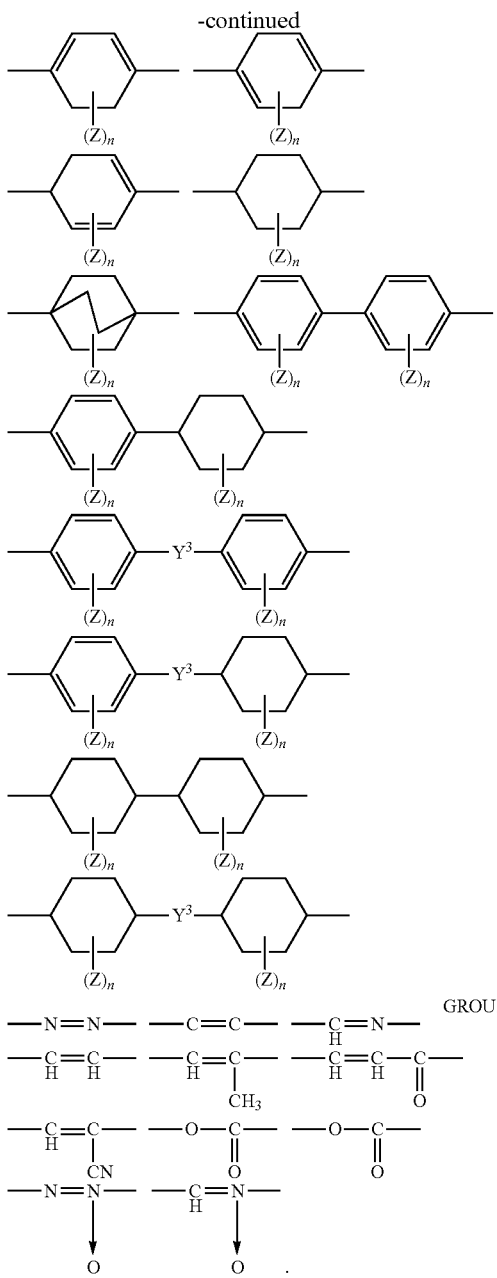

wherein the constituent element [B] further contains an epoxy resin prepolymer of the epoxy resin having the structure represented by general formula (1).

14. The carbon fiber reinforced composite material of claim 13, wherein the resin cured product has an endothermic peak at 250° C. or higher when heated from 50° C. to 400° C. at a rate of 5° C/min in differential scan calorimetric analysis under a nitrogen atmosphere.

15. The carbon fiber reinforced composite material according to claim 13, wherein the resin cured product contains a resin region indicating molecular anisotropy.

16. The carbon fiber reinforced composite material according to claim 13, wherein a ratio of the epoxy resin having a structure represented by the general formula (1) and the epoxy resin prepolymer to 100 parts by mass of all the epoxy resin in the constituent element [B] is 90 to 100 parts by mass.

17. The carbon fiber reinforced composite material according to claim 13, wherein a molecular weight of the prepolymer is 250 to 3500.

18. The carbon fiber reinforced composite material according to claim 13, wherein the prepolymer is a polymer of an epoxy resin having a structure represented by the general formula (1) or a reactant of an epoxy resin having a structure represented by the general formula (1) and a prepolymerization agent.

19. The carbon fiber reinforced composite material according to claim 18, wherein the prepolymerization agent is at least one selected from a group consisting of a phenol compound, an amine compound, an amide compound, a sulfide compound and an acid anhydride.

20. The carbon fiber reinforced composite material according to claim 18, wherein the prepolymerization agent is a phenol compound having two to four hydroxy groups in each molecule.

21. The carbon fiber reinforced composite material according to claim 13, wherein a content of the epoxy resin prepolymer is in a range of 5 to 80 parts by mass to 100 parts by mass of the total of the epoxy resin and the epoxy resin prepolymer in the constituent element [B].

22. The carbon fiber reinforced composite material according to claim 13, wherein the constituent element [C] is 3,3'-diaminodiphenylsulfone.

23. The carbon fiber reinforced composite material according to claim 13, wherein the group (I) in the general formula (1) is the following group:

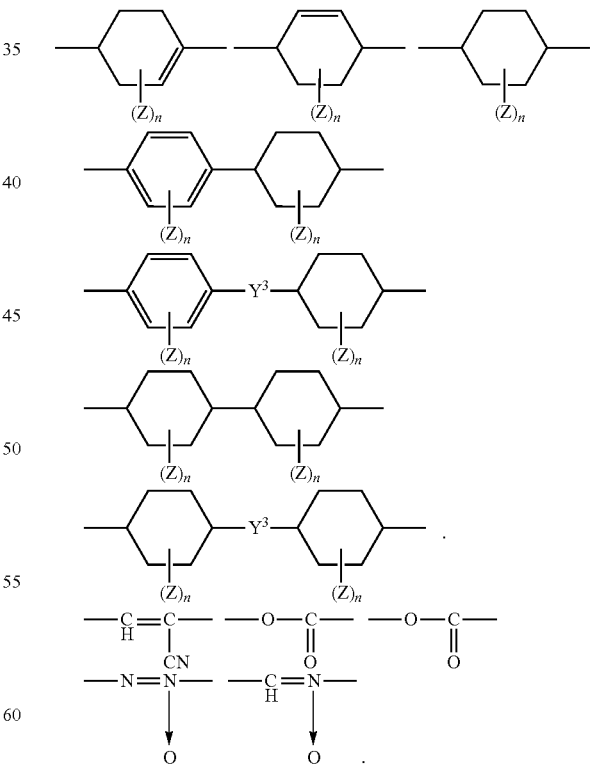

* * * * *